United States Patent
Sienkiewicz et al.

(10) Patent No.: US 12,133,148 B2
(45) Date of Patent: Oct. 29, 2024

(54) WIRELESS VEHICLE AREA NETWORK HAVING CONNECTED BRAKE SENSORS

(71) Applicant: Sensata Technologies, Inc., Attleboro, MA (US)

(72) Inventors: Frank Sienkiewicz, Bristol, RI (US); Matt Via, Attleboro, MA (US)

(73) Assignee: Sensata Technologies, Inc., Attleboro, MA (US)

( * ) Notice: Subject to any disclaimer, the term of this patent is extended or adjusted under 35 U.S.C. 154(b) by 352 days.

(21) Appl. No.: 17/612,168

(22) PCT Filed: Apr. 22, 2020

(86) PCT No.: PCT/US2020/029296
§ 371 (c)(1),
(2) Date: Nov. 17, 2021

(87) PCT Pub. No.: WO2020/236391
PCT Pub. Date: Nov. 26, 2020

(65) Prior Publication Data
US 2022/0221016 A1    Jul. 14, 2022

Related U.S. Application Data

(60) Provisional application No. 62/951,660, filed on Dec. 20, 2019, provisional application No. 62/951,561, (Continued)

(51) Int. Cl.
*B60T 17/22* (2006.01)
*B60Q 9/00* (2006.01)
(Continued)

(52) U.S. Cl.
CPC .............. *H04W 4/48* (2018.02); *B60Q 9/00* (2013.01); *B60T 17/221* (2013.01); *G01B 7/10* (2013.01);
(Continued)

(58) Field of Classification Search
CPC ........... H04W 4/38; H04W 4/40; H04W 4/44; H04W 4/46; H04W 4/48; B60T 17/22;
(Continued)

(56) References Cited

U.S. PATENT DOCUMENTS 5,339,069 A * 8/1994 Penner .................... F16D 65/60
188/1.11 R
9,157,820 B2    10/2015 Heise et al.
(Continued)

FOREIGN PATENT DOCUMENTS

DE    102010043320 A1    5/2012
DE    102013112527 A1    5/2015
(Continued)

OTHER PUBLICATIONS

Extended European Search Report mailed Apr. 11, 2023 for European Patent Application No. 20810311.9, 9 pages.
(Continued)

*Primary Examiner* — Christopher P Schwartz
(74) *Attorney, Agent, or Firm* — Lee & Hayes, P.C.

(57) ABSTRACT

A system for measuring brake data from a braking assembly of a vehicle. The braking assembly includes a floating portion that moves relative to brake pad wear. The system includes a brake sensor for each wheel. The brake sensors include a fixed sensing element and a target portion attached for movement with the floating portion. The sensing element generates a signal indicating a position of the target portion. The signal is used to determine brake pad thickness. The brake sensor also transmits the signal over a wireless vehicle area network for receipt and processing by a wireless hub in the vehicle area network. The vehicle area network can generate and transmit an alert and/or instructions for an autonomous vehicle based on the signal.

20 Claims, 35 Drawing Sheets

Related U.S. Application Data filed on Dec. 20, 2019, provisional application No. 62/951,594, filed on Dec. 20, 2019, provisional application No. 62/951,734, filed on Dec. 20, 2019, provisional application No. 62/944,981, filed on Dec. 6, 2019, provisional application No. 62/849,347, filed on May 17, 2019, provisional application No. 62/849,339, filed on May 17, 2019, provisional application No. 62/849,344, filed on May 17, 2019, provisional application No. 62/849,343, filed on May 17, 2019.

(51) Int. Cl.
| | |
|---|---|
| *G01B 7/06* | (2006.01) |
| *H04L 12/46* | (2006.01) |
| *H04W 4/38* | (2018.01) |
| *H04W 4/40* | (2018.01) |
| *H04W 4/44* | (2018.01) |
| *H04W 4/46* | (2018.01) |
| *H04W 4/48* | (2018.01) |
| *H04W 12/06* | (2021.01) |
| *H04W 12/50* | (2021.01) |
| *H04W 12/63* | (2021.01) |
| *H04W 76/10* | (2018.01) |
| *F16D 51/22* | (2006.01) |
| *F16D 66/00* | (2006.01) |
| *F16D 66/02* | (2006.01) |
| *H04L 12/40* | (2006.01) |

(52) U.S. Cl.
CPC .......... *H04L 12/4625* (2013.01); *H04W 4/38* (2018.02); *H04W 4/40* (2018.02); *H04W 4/44* (2018.02); *H04W 4/46* (2018.02); *H04W 12/06* (2013.01); *H04W 12/50* (2021.01); *H04W 12/63* (2021.01); *H04W 76/10* (2018.02); *B60T 17/22* (2013.01); *F16D 51/22* (2013.01); *F16D 2066/001* (2013.01); *F16D 2066/003* (2013.01); *F16D 2066/006* (2013.01); *F16D 66/025* (2013.01); *F16D 66/027* (2013.01); *H04L 12/40* (2013.01); *H04L 2012/40215* (2013.01); *H04L 2012/40273* (2013.01); *H04L 2012/40293* (2013.01)

(58) Field of Classification Search
CPC ......... B60T 17/221; G01B 7/10; F16D 51/22; F16D 66/025; F16D 66/027; F16D 2066/001; F16D 2066/003; F16D 2066/006
USPC ............... 188/1.11 E, 1.11 R; 701/31.4, 701; 340/453, 454
See application file for complete search history.

(56) References Cited

U.S. PATENT DOCUMENTS

| | | | |
|---|---|---|---|
| 10,173,486 | B1 | 1/2019 | Lee et al. |
| 10,973,061 | B2 | 4/2021 | Dieckmann |
| 11,451,957 | B2 | 9/2022 | Weaver |
| 2002/0019688 | A1* | 2/2002 | Mantini ................ F16D 66/026 701/31.4 |
| 2002/0051593 | A1 | 5/2002 | Oka |
| 2002/0061758 | A1 | 5/2002 | Zarlengo et al. |
| 2003/0209393 | A1 | 11/2003 | Affeldt et al. |
| 2003/0233189 | A1 | 12/2003 | Hsiao et al. |
| 2007/0195808 | A1 | 8/2007 | Ehrlich |
| 2008/0018445 | A1 | 1/2008 | Shimura |
| 2008/0227411 | A1 | 9/2008 | Martinez et al. |
| 2011/0143668 | A1 | 6/2011 | Farrell et al. |
| 2011/0241866 | A1* | 10/2011 | Todd ................. B60T 17/088 701/31.4 |
| 2011/0254679 | A1 | 10/2011 | Todd et al. |
| 2012/0254960 | A1 | 10/2012 | Lortz |
| 2013/0148748 | A1 | 6/2013 | Suda |
| 2013/0275018 | A1* | 10/2013 | Todd ................. F16D 66/00 701/70 |
| 2014/0357295 | A1 | 12/2014 | Skomra |
| 2015/0321666 | A1 | 11/2015 | Talty et al. |
| 2016/0052453 | A1 | 2/2016 | Nalepka |
| 2016/0057122 | A1 | 2/2016 | van Bergeijk |
| 2016/0325767 | A1 | 11/2016 | LeFebvre et al. |
| 2017/0082164 | A1 | 3/2017 | Serra et al. |
| 2017/0088145 | A1 | 3/2017 | Gordon et al. |
| 2017/0245321 | A1 | 8/2017 | Dieckmann et al. |
| 2017/0289254 | A1 | 10/2017 | Dieckmann et al. |
| 2017/0340908 | A1 | 11/2017 | Heath |
| 2018/0099712 | A1 | 4/2018 | Bean |
| 2018/0229786 | A1 | 8/2018 | Weaver |
| 2018/0306256 | A1 | 10/2018 | Evans |
| 2019/0016327 | A1 | 1/2019 | Heeder et al. |
| 2019/0064835 | A1 | 2/2019 | Hoofard |
| 2019/0107163 | A1* | 4/2019 | Medinei ................ F16D 66/026 |
| 2019/0111984 | A2 | 4/2019 | Bean et al. |
| 2019/0120313 | A1 | 4/2019 | Heeder et al. |
| 2019/0208552 | A1 | 7/2019 | Dieckmann et al. |
| 2019/0217831 | A1 | 7/2019 | Matthew |
| 2020/0247372 | A1 | 8/2020 | Vanantwerp |
| 2020/0296779 | A1 | 9/2020 | Moghe |
| 2022/0225064 | A1 | 7/2022 | Greer et al. |

FOREIGN PATENT DOCUMENTS

| | | |
|---|---|---|
| DE | 102014015394 A1 | 4/2016 |
| DE | 102016010644 A1 | 3/2018 |
| WO | WO2018023104 A1 | 2/2018 |
| WO | WO2018075439 A1 | 4/2018 |
| WO | WO2020236391 A1 | 11/2020 |
| WO | WO2020236392 A1 | 11/2020 |

OTHER PUBLICATIONS

Extended European Search Report mailed Jan. 23, 2023 for European Patent Application No. 20809232.0, 18 pages.
Partial European Search Report mailed Nov. 4, 2022 for European Patent Application No. 20809232.0, 16 pages.
The PCT International Search Report dated Aug. 31, 2020 for PCT application No. PCT/US20/29296, 5 pages.
The PCT Invitation to Pay Additional fees dated Jul. 1, 2020 for PCT application No. PCT/US20/29296, 2 pages.
The International Report on Preliminary Patentability for PCT Application No. PCT/US20/29256, mailed Dec. 2, 2021.
The International Report on Preliminary Patentability for PCT Application No. PCT/US20/29262, mailed Dec. 2, 2021.
The PCT International Search Report mailed Jul. 27, 2020 for PCT application No. PCT/US20/29317, 16 pages.
Santa, et al., "Telematic platform for integral management of agricultural/perishable goods in terrestrial logistics", Computer and Electronics in Agriculture, vol. 80, Oct. 16, 2011, pp. 31-40.
Office Action for U.S. Appl. No. 17/612,181, mailed on Feb. 14, 2024, Greer, "Tractor Trailer Vehicle Area Network With Trailer Sub-Network", 23 pages.

* cited by examiner

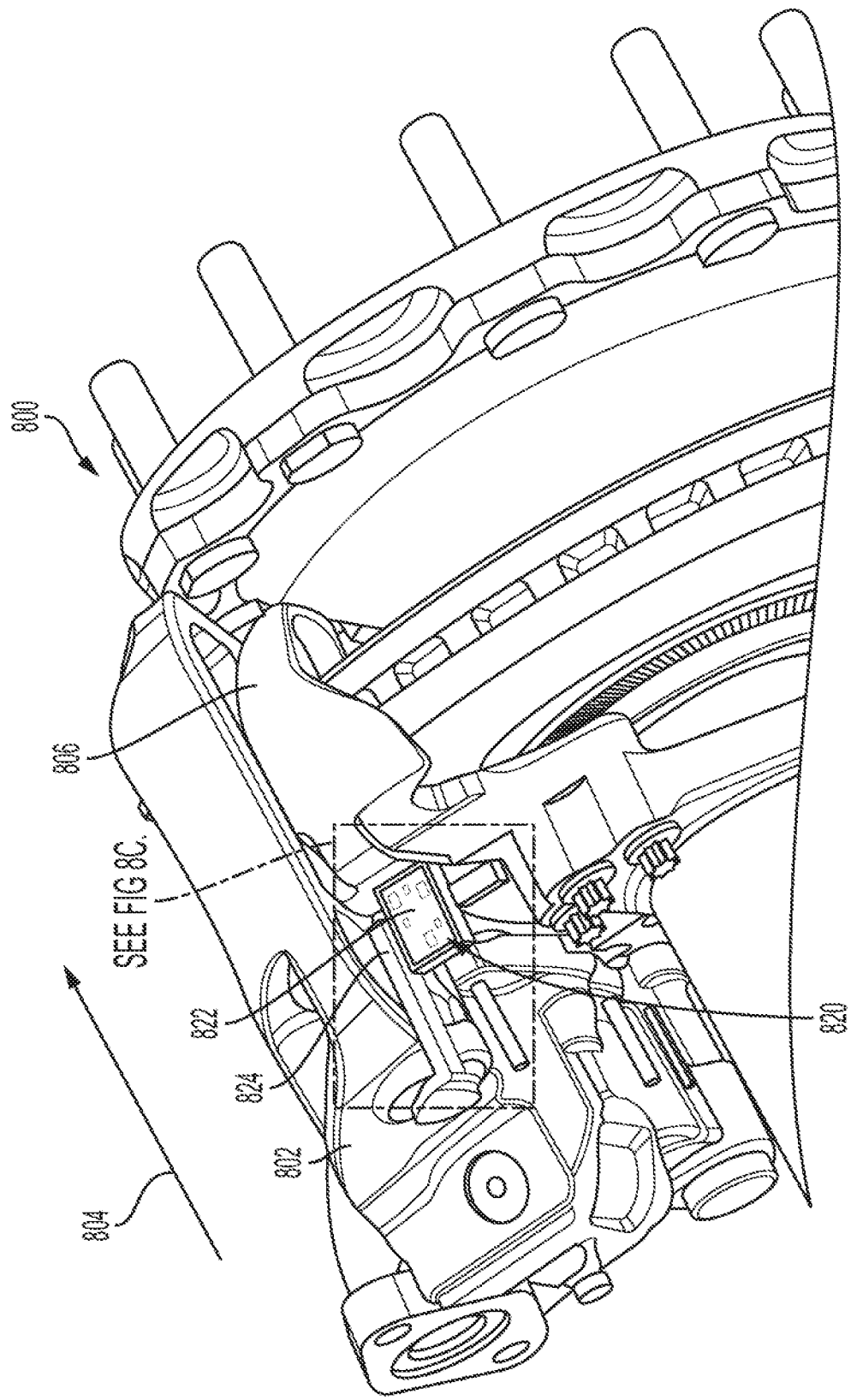

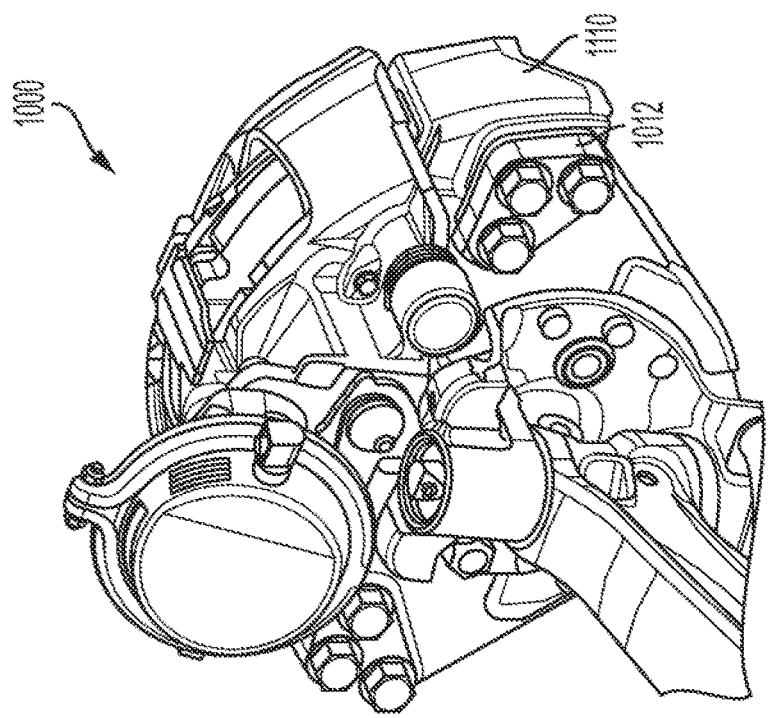
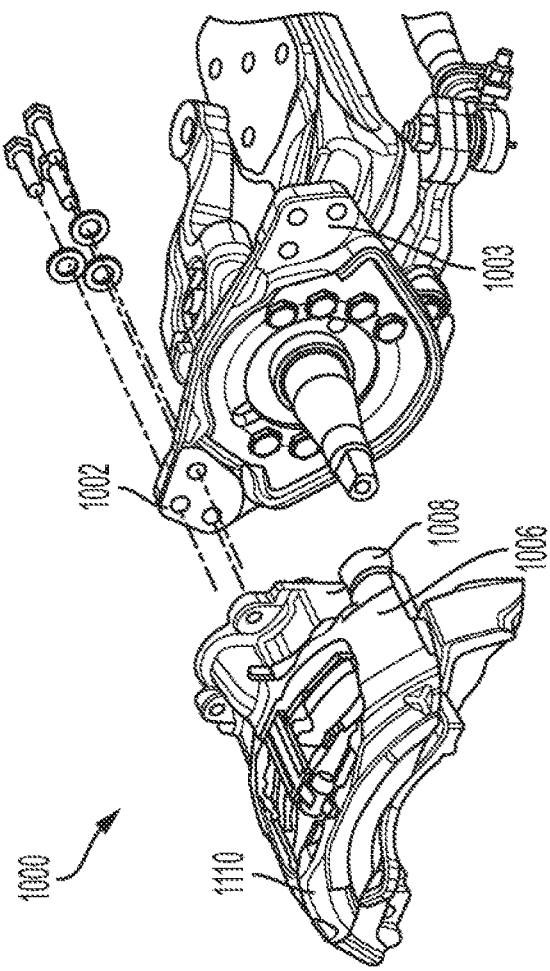
FIG. 10A
FIG. 10B

WIRELESS VEHICLE AREA NETWORK HAVING CONNECTED BRAKE SENSORS

CROSS REFERENCE TO RELATED APPLICATIONS

This application is the National Stage of International Application No. PCT/US2020/029296, filed Apr. 22, 2020, which claims priority to and the benefit of: U.S. Provisional Patent Application No. 62/849,347, filed on May 17, 2019; U.S. Provisional Patent Application No. 62/849,344, filed on May 17, 2019; U.S. Provisional Patent Application No. 62/849,343, filed on May 17, 2019; U.S. Provisional Patent Application No. 62/849,339, filed on May 17, 2019; U.S. Provisional Patent Application No. 62/944,981, filed on Dec. 6, 2019; U.S. Provisional Patent Application No. 62/951,561, filed on Dec. 20, 2019; U.S. Provisional Patent Application No. 62/951,734, filed on Dec. 20, 2019; U.S. Provisional Patent Application No. 62/951,594, filed on Dec. 20, 2019; and U.S. Provisional Patent Application No. 62/951,660, filed on Dec. 20, 2019, the contents of each of which are incorporated herein by reference as though fully set forth herein.

FIELD OF THE TECHNOLOGY

The subject technology relates to wireless networks, and particularly to brake sensors connected to a vehicle area network.

BACKGROUND OF TECHNOLOGY

In the United States, the Dwight D. Eisenhower National System of Interstate and Defense Highways, commonly known as the Interstate Highway System, is a network of controlled-access highways that forms part of the National Highway System in the United States. Construction of the Interstate Highway System was authorized by the Federal Aid Highway Act of 1956. The Interstate Highway System extends throughout the contiguous United States and has routes in Hawaii, Alaska, and Puerto Rico.

With great roads, trucking is an essential component of the economy infrastructure. Indeed, a tractor-trailer vehicle cruising down the Interstate Highway is common. Trucking is involved in the delivery of not only almost every consumer product but industrial products as well. Truck drivers are often independent drivers who may or may not own their own trailer but, in any case, contract to deliver one or more full-load or part-load trailers. Indeed, being a truck driver is one of the most common jobs in America.

A paradigm shift is on the horizon as the asphalt highway is integrated into the information age. Such vehicles will be equipped with a suite of technology to connect to the information superhighway and image the physical superhighway. The vehicles will form a virtual image of the road that is processed for navigation and control. The technology will include cameras, LIDAR, RADAR, sensors of all sorts, motors and of course a large processing capacity (e.g., processors, memory, power supplies etc.).

Problems with transport by tractor-trailer vehicle remain despite the longstanding and ubiquitous use. Mobile vehicles have been slow to beneficially utilize the potential benefits of interconnection and analysis. Other obstacles stem from the typical driver not being comfortable navigating use of sophisticated electronics or various configurations that are simply not interoperable. Further, without drivers, many more tasks and maintenance activities must be automated. Thus, a need exists for easy, automatic connection and operation of vehicles with more sophisticated communication and networking technology on vehicles, particularly tractor-trailer vehicles.

Various types of sensors have been employed on vehicles, and particularly on tractor-trailer trucks. Normally these sensors are placed on the tractor-trailer truck and manually calibrated to trigger a generic alert (e.g. a tire pressure alert) when a certain measurement is returned. This requires the sensors to be initially tested and calibrated on the vehicle. The utility of each sensor is limited to selectively triggering the alert, and no data from the sensors is gathered or processed for analysis.

Further, challenges arise with adequately placing sensors within an existing vehicle system, such as a braking system. It is difficult to place a sensor, or multiple sensors, within an existing braking system without potentially impacting the integrity of the braking system. Further, assemblies for indicating brakewear are typically integrated into consumable components like the pads themselves. Thus, when the pads are changed, the sensor assembly is also replaced.

SUMMARY OF THE TECHNOLOGY

In light of the needs described above, in at least one aspect, the subject technology relates to a number of brake sensors connected directly to the braking components of a vehicle and reporting data to a wireless hub over a wireless vehicle area network. Further, the sensor assemblies are separate from the consumable components so that use is uninterrupted by routine repair and maintenance.

In at least one aspect, the subject technology includes system for measuring brake data from a braking assembly of a vehicle, the braking assembly including at least one caliper with a fixed portion and a floating portion. The system includes a plurality of brake sensors. Each brake sensor is attached to one of the calipers and includes a sensing element attached to the fixed portion and a target portion attached to the floating portion. The brake sensor is configured to measure brake data including a position of the target portion with respect to the sensing element indicative of brake pad thickness. The brake sensor is also configured to transmit brake data over a wireless vehicle area network. The system also includes a wireless hub which includes a transceiver configured to transmit and receive data over the wireless vehicle area network. The wireless hub is configured to receive brake data from the plurality of brake sensors, process the brake data, and generate and transmit an alert when brake data from one of the plurality of brake sensors indicates a potential fault condition.

In some embodiments, the target portion is a magnet that generates a magnetic field and the sensing element is an anisotropic magnet resistivity sensor configured to sense the magnetic field of the magnet to generate a signal.

In at least one aspect, the subject technology relates to a system for measuring brake data from a braking assembly of a vehicle. The braking assembly includes a caliper with a fixed portion and a floating portion. The caliper further includes a mounting plate configured to attach the caliper to an axle of the vehicle. The system includes a brake sensor mounted to the caliper on an interior side of the mounting plate such that the brake sensor is positioned within an interior of the caliper. The brake sensor includes a sense element attached to the fixed portion and a target portion attached to the floating portion. The brake sensor is configured to measure brake data including a position of the fixed portion with respect to the floating portion and transmit the brake data over a wireless vehicle area network.

In some embodiments, the system includes a wireless hub having a transceiver configured to transmit and receive data over the wireless vehicle area network. The wireless hub is configured to receive brake data from the plurality of brake sensors, process the brake data, and generate and transmit an alert when brake data from one of the plurality of the brake sensors indicates a potential fault condition.

In some embodiments, the braking system further comprises at least one temperature sensor. In such a case, the wireless hub can be further configured to detect an anomaly in a temperature measured by the at least one temperature sensor during a time period. After detecting an anomaly, the wireless hub can compare the temperature measured by the at least one temperature sensor during the time period to temperature data from at least one wheel end temperature sensor. The wireless hub can then generate and transmit an alert when the comparison is indicative of a fault condition.

In at least one aspect, the subject technology relates to a system for measuring brake data from a drum brake assembly of a vehicle, the drum brake assembly including a brake chamber which actuates a push rod when vehicle brakes are applied, actuation of the push rod causing a rotary motion of an adjuster arm and attached slack adjuster head around a cam shaft. The system includes a brake sensor mounted to the drum brake assembly and configured to measure brake data including a displacement of the drum brake assembly during braking. The brake sensor is configured to transmit brake data over a wireless vehicle area network.

In some embodiments, the brake sensor includes a sensing element and a target, the sensing element configured to sense a magnetic field of the target. The sense element can be attached to a fixed brake chamber bracket, the fixed brake chamber bracket remaining at a fixed location with respect to the vehicle when the vehicle brakes are applied. In such a case, the target is attached to the pushrod and configured to move, with respect to the sense element, when the vehicle brakes are applied.

In some embodiments, the sense element is attached to a fixed mount plate adjacent the slack adjuster head, the fixed mount plate remaining at a fixed location with respect to the vehicle when the vehicle brakes are applied. In such a case, the target is attached to the slack adjuster head and configured to move, with respect to the sense element, when the vehicle brakes are applied.

In some embodiments, the target is attached to a fixed indicator plate adjacent the cam shaft, the fixed indicator plate remaining at a fixed location with respect to the vehicle when the vehicle brakes are applied. In such a case, the sense element is attached to the adjuster arm such that the sense element moves as the adjuster arm and cam shaft rotate when the vehicle brakes are applied.

In some embodiments, the drum brake assembly is configured to rotate an s-cam when the brakes are applied such that the s-cam engages two cam followers coupled to opposing brake shoes. In such a case, the displacement of the drum brake assembly measured by the system is representative of a difference in displacement distance between the two cam followers when the brake assembly is in a disengaged state and when the brake assembly is in an engaged state. The system can be further configured to measure an s-cam rotation angle, the difference in displacement distance between the two cam followers being calculated based on the s-cam rotation angle.

In some embodiments, the system is configured to determine a current brake pad thickness by calibrating the drum brake assembly at an initial brake pad thickness ($t_i$) and initial s-cam rotation angle ($\theta_i$). The system determines a slope of a plot of cam follower displacement over s-cam rotation angle (m). The system measures a current s-cam rotation angle (On). Finally, the system calculates the current brake pad thickness by setting the current brake pad thickness as equal to the following: $t_i - m\,(\theta_n - \theta_i)$. In some cases, the system is configured to provide an alert based on an expected brake pad failure thickness. In some cases, the system is configured to provide an indicator of one or more of the following: a distance until drum brake assembly maintenance is recommended; or a distance until drum brake assembly failure is expected. Actual data about particular driver habits and/or expected routes may also be used in the maintenance calculation.

BRIEF DESCRIPTION OF THE DRAWINGS

So that those having ordinary skill in the art to which the disclosed system pertains will more readily understand how to make and use the same, reference may be had to the following drawings.

FIG. 8B is a detailed perspective view of a brake system having a brake sensor assembly in accordance with the subject technology.

FIG. 10A is a perspective semi-exploded view of a disc brake system in accordance with the subject technology.

FIG. 10B is a different perspective semi-exploded view of a disc brake system in accordance with the subject technology.

DETAILED DESCRIPTION

Figure 1:
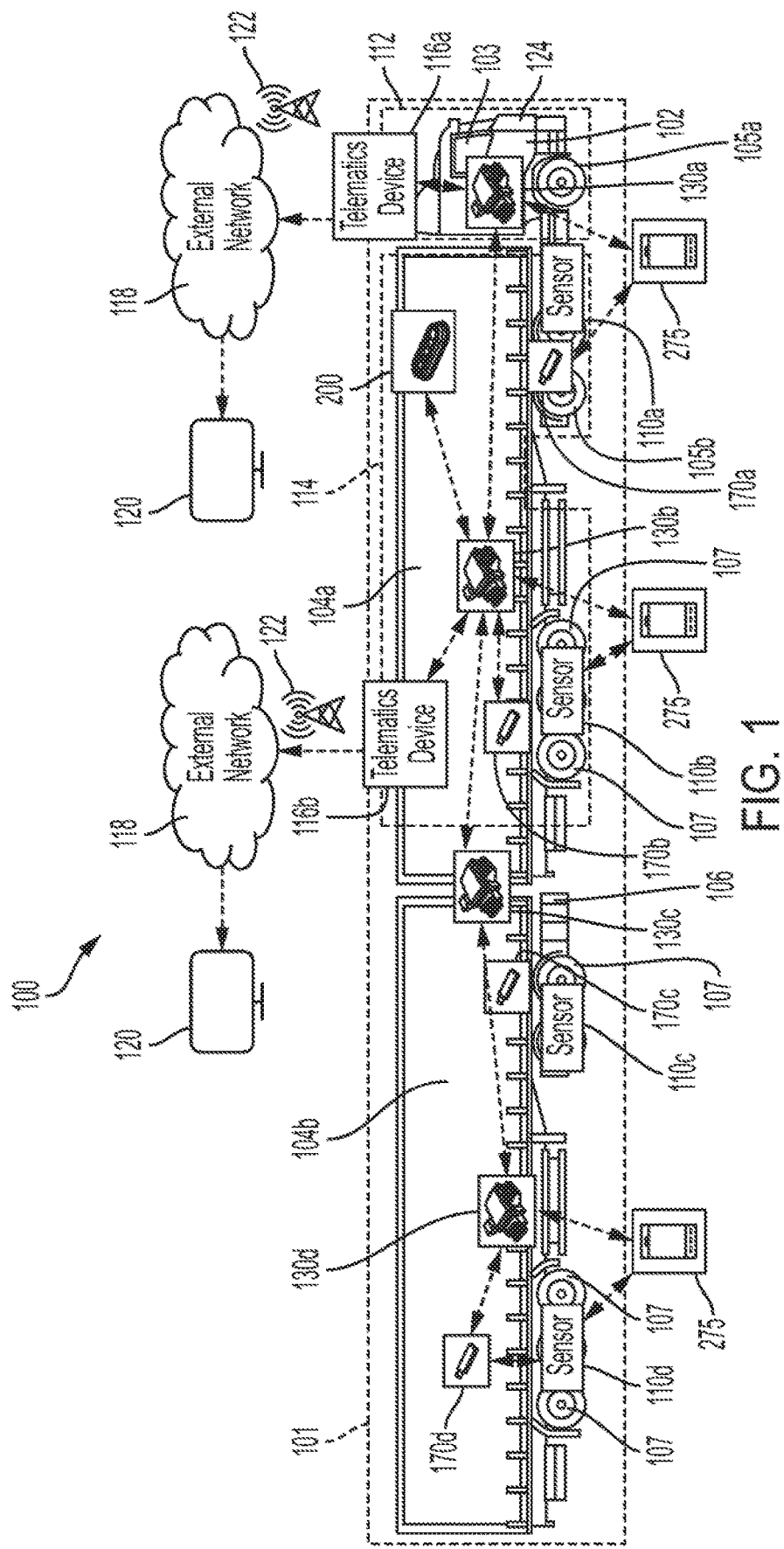
FIG. 1 is an exemplary tractor-trailer vehicle utilizing a vehicle area network in accordance with the subject technology.

The subject technology overcomes many of the prior art problems associated with vehicle sensor systems for connecting sensors to vehicle brakes and processing sensor data. The advantages, and other features of the systems and methods disclosed herein, will become more readily apparent to those having ordinary skill in the art from the following detailed description of certain preferred embodiments taken in conjunction with the drawings which set forth representative embodiments of the present invention. Like reference numerals are used herein to denote like parts. Further, words denoting orientation such as "upper", "lower", "distal", and "proximate" are merely used to help describe the location of components with respect to one another. For example, an "upper" surface of a part is merely meant to describe a surface that is separate from the "lower" surface of that same part. No words denoting orientation are used to describe an absolute orientation (i.e. where an "upper" part must always be at a higher elevation).

Referring now to FIG. 1, an exemplary vehicle 100 is shown utilizing a vehicle area network (VAN) 101 in accordance with the subject technology. The vehicle 100 has a tractor 102 for pulling two trailers 104a, 104b. The tractor 102 may haul just a single trailer or multiple trailers, and as many as five. It is typically the responsibility of the truck driver to not only ensure the safe and proper operation of the vehicle 100 but to also connect and disconnect the trailers 104a, 104b. The tractor 102 also includes a cabin 103 having a dashboard (not explicitly shown) for presenting information related to the trailers 104a, 104b. The tractor 102 has front wheels 105a, which can be steered to control direction of the tractor 102. The tractor 102 also has rear wheels 105b. A dolly 106 facilitates mechanical connection of the first and second trailers 104a, 104b. The trailers 104a, 104b and dolly 106 also include wheels 107.

The trailers 104a, 104b and dolly 106 are equipped with a plurality of sensors for monitoring position, speed, temperature, pressure, weight and the like for various purposes. In FIG. 1, the components of the VAN 101 such as sensors 110a-c are shown schematically to illustrate possible locations and configurations. The driver is provided with a pairing device 275 for making wireless connections between the VAN 101 and the sensors 110. The pairing device 275 also can monitor the status of the trailers 104a, 104b as well as connect to the devices of the VAN 101. The pairing device 275 may be a tablet, smart phone, or specialized controller and the like.

The VAN 101 establishes communication between numerous components of the vehicle 100. Individual components can be connected wirelessly, wired and combinations thereof. The connections may utilize various communication protocols, as will be discussed in more detail herein. The VAN 101 can utilize WiFi to establish a high bandwidth backbone, in effect a first level of the VAN 101. The VAN 101 may include any number of sub-networks, in effect second levels of the VAN 101. For example as shown in FIG. 1, the VAN 101 includes a tractor subnetwork 112 and a trailer subnetwork 114. Each subnetwork 112, 114 includes one or more wireless hubs 130a-d. The first trailer 104a includes the wireless hub 130b, the dolly 106 includes the wireless hub 130c and the second trailer 104b includes wireless hub 130d. As the tractor 102, trailers 104a, 104 and dolly 106 are often reconfigured with other trailers and dollies, quick and easy pairing to establish the subsequent vehicle area network is beneficial.

The VAN 101 also includes a first telematics module 116a on the tractor 102 and in communication the tractor hub 130a as well as a second telematics module 116b on the first trailer 104 and in communication with the first trailer hub 130b. The telematics modules 116a, 116b also communicate with external networks 118 having external devices 120. The telematics modules 116a, 116b communicate with the external networks 118 via cell towers 122. Preferably, the tractor 102 has a chassis CAN bus 124 over which the tractor hub 130a and the telematics module 116a communicate. The trailers 104a, 104b may be substantially identical or quite differently configured not just in terms of hardware but software. However, the VAN 101 can automatically integrate components so that the driver is needed for little pairing activity with the smart device 275 if any at all. Telematics modules and services are available commercially from numerous suppliers, such as CalAmp of Irvine, California.

The wireless hubs 130a-d are powered by a wired power line communication (PLC) cable, typically connected by the driver when mechanically coupling the trailer 104a, 104b to the tractor 102. The wireless hubs 130a-d communicate using WiFi with a 802.15.4 thread network protocol and/or over the CAN bus 124. The wireless hubs 130a-d can also communicate by common lower power friendly means such as Bluetooth or 433 Mhz technology. The wireless hubs 130a-d can also use near-field communication as well as with any other wireless communication protocol now known or later developed.

The hubs 130a-d can be connected to one or more components or each other using a wired connection. For example, the tractor hub 130a can be connected to the front trailer hub 130b with a wired cable connection. The wired cable connection can optionally provide power from the tractor hub 130a to the trailer hub 130b while simultaneously allowing communication through PLC techniques. The wired connection can allow the tractor hub 130a and the first trailer hub 130b to automatically pair upon making the physical connection. During pairing, the hubs 130a, 130b communicatively connect utilizing the PLC connection to share credentials of the VAN 101 in accordance with out of band pairing techniques. Similarly, the hubs 130c, 13d can also be hard wired and automatically integrated into the VAN 101.

Each wireless hub 130a-d acts as central communication or access point for devices within the respective local area or subnetwork 112, 114 of the vehicle 100. To that end, the tractor wireless hub 130a creates the tractor subnetwork 112 for all devices in and around the tractor 102 of the vehicle 100. Similarly, the first trailer hub 130b creates the trailer subnetwork 114 for all devices in and around the first trailer 104a. Further, a wireless hub 130c on the dolly 106 is part of the first trailer subnetwork 114 but could even form another subnetwork. Other subnetworks may also be included, for example, for other additional trailers, dollies, and/or areas of the truck.

Still referring to FIG. 1, the tractor wireless hub 130a establishes communication to the tractor telematics module 116a, the pairing device 275 and the first trailer wireless hub 130b to establish the tractor subnetwork 112. The tractor hub 130a can communicate with the first trailer hub 130b by PLC and/or WiFi, with the pairing device 275 by WiFi, and over the CAN bus 124 with the telematics module 116a. In one embodiment, the tractor hub 130a uses Thread networking communication technology based on the IEEE 802.15.4 radio standard for low power consumption and latency. The communication protocol may include AES 128 encryption with a media access control (MAC) layer network key.

The tractor 102 also includes a plurality of sensors 110a. For simplicity in FIG. 1, only one sensor 110a is shown schematically, but represents any kind of sensor in any location. In order to facilitate communication between the tractor hub 130a and the sensor 110a, the tractor subnetwork 112 can include a range extender transmitter/receiver 170a paired with the sensor 110a. Depending upon the sensor configuration, the sensor 110a may also communicate directly with the tractor hub 130a. The transmitter/receiver 170a and sensor 110a may utilize Thread networking communication technology among others.

For example, communication between the transmitter/receiver 170a and sensor 110a may be via Bluetooth communication. The transmitter/receiver 170a acts as a range extender for the sensor 110a. However, Bluetooth is susceptible to eavesdropping so that out of band (OOB) pairing is needed. The pairing device 275 is used to accomplish the OOB pairing. The pairing device 275 can use near-field communication (NFC) with the hubs 130a-d, sensors 110a-d and transmitter/receivers 170a-d.

Pairing the components 110a-d, 130a-d, 170a-d can use multiple technologies and techniques in any combination. The example given here is based on the normal commissioning/pairing process for a Thread device. The pairing device 275 can use WiFi or even read a barcode to link to the hub 130a. Once linked to the hub 130a, the pairing device 275 can use RFID technology such as an NFC tag to establish the OOB (Out of Band) pairing connection to the transmitter/receiver 170a and sensor 110a. NFC technology is desirable because the pairing device 275 could simply be a smart phone running an application and held in proximity to the transmitter/receiver 170a or sensor 110a. The OOB pairing link can use datagram transport layer security (DTLS), which is a communications protocol that provides security by allowing communication in a way that is designed to prevent eavesdropping, tampering, and message forgery. Additionally, access can be protected by using a pre-shared key (PSK) generated by an algorithm such a J-PAKE.

Once the pairing device 275 establishes communication between the hub 130a, sensor 110a and transmitter/receiver 170a, the tractor subnetwork 112 is established. In a similar manner, the trailer subnetwork 114 can be established. The first trailer hub 130b establishes the first trailer subnet 114 that also includes a plurality of sensors 110b. Again for simplicity, only a single sensor 110b is shown schematically representing, for example, a TPMS. A transmitter/receiver 170b is paired with the sensor 110b. The first trailer 104a also includes a telematics module 116b and beacon 200, both of which are part of the first trailer subnetwork 114. The telematics module 116b communicates with external networks 118 via a cell tower 122 as well. The beacon 200 may also communicate directly, whether wired or wirelessly, with the tractor hub 130a.

The tractor hub 130a is also paired to the trailer hub 130b so that the respective subnetworks 112, 114 are in secure communication. To pair the hubs 130a, 130b, the OOB pairing link can use a physical connection with ISO 11992, which is a CAN based vehicle bus standard in the heavy-duty truck industry for communication between the tractor and one or more trailers. The pairing of the hubs 130a, 130b can share a unique data key such as a key generated by AES-128 encryption.

The beacon 200 provides a separate means of transmitting information wirelessly. In particular, the beacon 200 can be configured to act as a GPS, transmitting location data for the first trailer, allowing a remote user to locate the trailer. The beacon 200 is particularly useful for tractor drivers who are picking up a trailer from a large lot of many trailers. For example, certain lots tend to store an enormous number of trailers and are not well organized or marked, requiring drivers to search to locate a particular trailer. Typically, the driver is tasked with seeking out the trailer through a particular identifier on the trailer, such as a license plate. This inefficiently requires the driver to look individually at the license plate of each trailer on the lot to determine whether it is the correct trailer. Further, license plates can be difficult to read accurately from a distance, requiring the driver to approach each license plate within a reasonable distance or even get out of the tractor. As such, the beacon 200 improves the manual searching process by providing a GPS signal to the external networks 118 which ultimately is received by telematics module 116a in the tractor 102. Thus, the beacon GPS signal can be used by the driver to quickly and easily locate the trailer 104a within the lot. It is envisioned that the dashboard of the tractor 102 may display not only the location of the beacon 200 but assist with directions on how to drive to the beacon 200. The beacon 200 can also include a clear visual identifier, such as a blinking light of a specified color or a display showing an identifier, to alert the driver when the driver is close to the correct trailer 104a. The beacon 200 eliminates the need for the driver to carefully search the entire lot and allows the driver to quickly and easily identify and connect to the proper trailer.

Still referring to FIG. 1, the dolly 106 and second trailer 104b also include respective hubs 130c, 130d that become part of the VAN 101. The hubs 130c, 130d similarly communicate with a plurality of sensors 110c, 110d and any transmitter/receiver 170c, 170d paired with the sensors 110c, 110d. Depending upon the configuration, the hubs 130c, 130d may form subnetworks or simply communicate with the first trailer hub 130b, which relays the information to the tractor hub 130a. The second trailer 104b can include a telematics module, beacon and other hardware as needed.

Generally, a transmitter/receiver 170a-d is positioned proximate a respective sensor, which may be pressure, temperature, speed, position, or other sensors. The transmitter/receiver 170a-d receives measured data from one or more sensors and reports that data to the local hub wirelessly. The transmitter/receiver 170a-d may also use the 433 MHz frequency band for communication. In other cases, the sensors 110a-d are wired directly to the local hub 130a-d, or are connected wirelessly directly to the local hub 130a-d.

It is envisioned that the subnetworks 112, 114 can be established in advance. In other words, for the trailer subnetwork, pairing the sensor 110b, transmitter/receiver 170b and hub 130b can be accomplished during assembly by a technician using a pairing device 275. As noted above, the pairing may be very automatic, and to the extent needed, performed by the driver upon connection of the trailer 104a. Many sensors and such devices can be difficult to physically access so that pairing upon installation is advantageous. A sensor, for example, might be located on an axle of the vehicle or within a vehicle braking system. The driver or technician's pairing device 275 may be able to read a code from the sensor, such as a QR code or NFC tag. The technician's pairing device 275 will be trusted by the VAN 101 (e.g. having passcode credentials for the network, or the like) and/or can be manually connected to the VAN 101, whether wired or wirelessly. The pairing device 275 can then pair the sensor 110b to the hub 130b using the code from the sensor 110b, thereby connecting the sensor 110b to the subnetwork 114 and, ultimately, to the VAN 101.

Once the transmitter/receivers 170a-d are paired for wireless communication to corresponding wireless hubs 130a-d, information can then be transmitted from multiple devices across the VAN 101. The data can be processed and provided to a central location of the vehicle 100, such as within the tractor 102 where the driver can see alerts, or other feedback related to the readings of the sensors 110a-d.

In some cases, one or more of the tractor 102 and trailers 104a, 104b can include a 3rd party, on-board telematics device 116a, 116b. In the example shown, the tractor hub 130a is in communication with a first telematics device 116a and the first trailer hub 130b is in communication with a second telematics device 116b in the first trailer 104a. Each telematics device 116a, 116b transmits data to a third party source. In the example given, the data is transmitted to an external cloud platform where the data can then be obtained by external devices 120, such as computers, smartphones or the like (e.g., the pairing device 275). The data can then be relied upon for fleet and asset management functions, such as checking health of various components of the truck. In other cases, the telematics devices 116a, 116b can transmit to mediums other than a cloud network, such as a wide area network or directly to third party devices.

Once information from the VAN 101 is transmitted out of the vehicle 100 to the external networks 118 and devices 120, additional data review, analysis and insight can be ascertained. The analysis and insight can then be sent back to the trailer 102 for review by the driver. A suite of warning strategy functionality can be general or specific to particular needs. The algorithm that develops the warnings is optimized by ongoing data analysis. For example, the vehicle behavior is characterized so that particularly identified parameters can be measured. Some parameters are tire pressure with reference temperature, spare tire pressure, system temperature, system pressure, and gross vehicle weight (GVW). The external device 120 may have specific data such as a range or maximum allowable limit. Since the maintenance of these parameters is ongoing, if the GVW is over limit or out of range, or a tire is under low pressure or unsafe to drive on, a warning message can be sent to the driver for investigation and corrective action. For another example, a fast pressure loss in a tire would generate an alert to the driver.

The subnetworks 112, 114 for the vehicle 100 are part of and in local communication within the broader VAN 101, with one wireless gateway hub acting as an access point for the VAN 101. In some cases, the access point for the VAN 101 can change to a different gateway depending on the number of trailers 104 attached to the tractor 102 such that the access point is in a central location of the vehicle 100. To centralize the access point, the tractor hub 130a searches down the length of the vehicle 100 for additional hubs 130 to determine a centrally located hub 130. Since the hubs 130 will be somewhere along the length of the vehicle 100, the VAN 101 can determine hub locations through a linear search, rather than by searching a broad surrounding radius.

If, for example, only a single trailer 104a is provided, the access point can be the wireless hub 130 in the center of the one trailer, which all devices (e.g., transmitter/receivers, sensors and the like) in the trailer 104a or tractor 102 can wirelessly reach. If the second trailer 104b is included, the access point could still be located within the first trailer 104a at a location central to the vehicle 100 or, alternatively at the dolly hub 130c which is also centrally located. If additional trailers are added (e.g. a third and fourth trailer), the access point can be changed to a new hub at a central location of the vehicle 100, or can use multiple interconnect access points to leap frog wireless signals through the entire length of the vehicle 100. Alternatively, a full WiFi mesh system could be used to connect many hubs at locations across the vehicle 100. Having wireless hubs 130a-d which control the central communication at each area of vehicle 100 allows many devices to quickly and easily communicate over the VAN 101, even when devices within the VAN 101 may be changed (e.g., sensor repair), or new or additional trailers and dollies may be added to the vehicle 100. In each case, each new device need only be paired and connected to one wireless hub, and data from all devices can be shared across the VAN 101. From the above, it should be understood that the exact number and arrangement of the components shown in FIG. 1 are exemplary only, and should not be construed as limiting.

Autonomous Vehicles

As vehicles become self-driving, the subject technology wills seamlessly integrate with the suite of autonomous technology. For example, the data analysis from monitoring the sensors can be used to control speed or even redirect the autonomous vehicle to a service station or rest stop to attend to repairs. The data analysis may also require the autonomous vehicle to enter an emergency mode where the vehicle may be pulled over for towing or control ceded to a remote operator.

In one embodiment, the tractor and the trailer are merged as one. As would be expected, the integration of sensors on the trailer portion into the vehicle area network on the merged tractor-trailer is only required initially. The merged tractor-trailer can still connect and carry additional trailers.

Wireless Hubs

As used herein, a micro controller, computer or smart device is one or more digital data processing devices. Such a device generally can be a personal computer, computer workstation (e.g., Sun, HP), laptop computer, a tablet computer, server computer, mainframe computer, handheld device (e.g., personal digital assistant, Pocket PC, cellular telephone, etc.), information appliance, printed circuit board with components or any other type of generic or special-purpose, processor-controlled device, with or without application specific integrated circuits (ASICs), capable of receiving, processing, displaying, and/or transmitting digital data. A controller includes random access memory (RAM), mechanisms and structures for performing input/output operations, a storage medium such as a magnetic hard disk drive(s), and an operating system (e.g., software) for execution on a central processing unit (CPU). The controller also has input and output devices such as a display screen, a keyboard and mouse and the like.

A CPU generally is logic circuitry that responds to and processes instructions that drive a controller and can include, without limitation, a central processing unit, an arithmetic logic unit, an application specific integrated circuit, a task engine, and/or any combinations, arrangements, or multiples thereof. Software or code generally refers to computer instructions which, when executed on one or more digital data processing devices, cause interactions with operating parameters, sequence data/parameters, database entries, network connection parameters/data, variables, constants, software libraries, and/or any other elements needed for the proper execution of the instructions, within an execution environment in memory of the digital data processing device(s).

A module is a functional aspect, which may include software and/or hardware. Typically, a module encompasses the necessary components to accomplish a task. It is envisioned that the same hardware could implement a plurality of modules and portions of such hardware being available as needed to accomplish the task. Those of ordinary skill will recognize that the software and various processes discussed herein are merely exemplary of the functionality performed by the disclosed technology and thus such processes and/or their equivalents may be implemented in commercial embodiments in various combinations without materially affecting the operation of the disclosed technology.

Figure 2A:
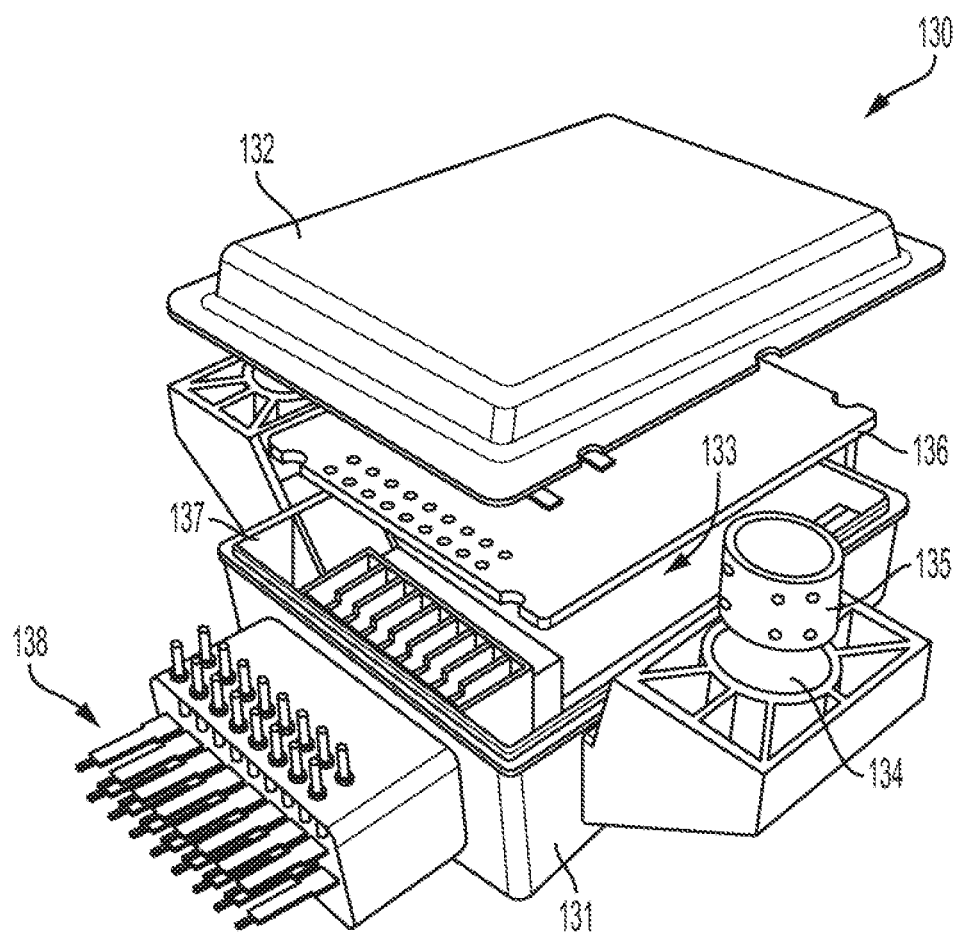
FIG. 2A is an exploded view of a wireless hub in accordance with the subject technology.

Referring now to FIG. 2A, an exploded view of a wireless hub 130 is shown. Each hub 130a-d may be differently configured, but in FIG. 2A an exemplary hub 130 is shown. The wireless hub 130 includes an enclosure 131 with a removable lid 132 that connects to form a protected interior 133. The enclosure 131 forms opposing recesses 134 for compression limiters 135 to maintain the joint integrity of the plastic enclosure 131. The hub 130 includes a printed circuit board (PCB) 136 having electronics, such as a processor and memory (not explicitly shown) required to create modules to carry out the functions of the wireless hub 130, including data processing, storage, and transmission.

The wireless hub 130 has an antenna (not shown explicitly) connected to the PCB 136 for wireless transmission. Additional antennas may be included as needed to allow the hub 130 to transmit and receive data with other devices as described herein. For wired connections, the hub 130 includes connecting pins 138. The hub 130 may be powered by a battery and/or from a wired connection. In one embodiment, the hub 130 is connected to a +12/24V supply 144 (see FIG. 2B). The wireless hub 130 is configured to withstand large temperature changes in the range of −40° C. to +85° C. The hub 130 mounts external to the tractor cabin such as on the chassis rail.

Figure 2B:
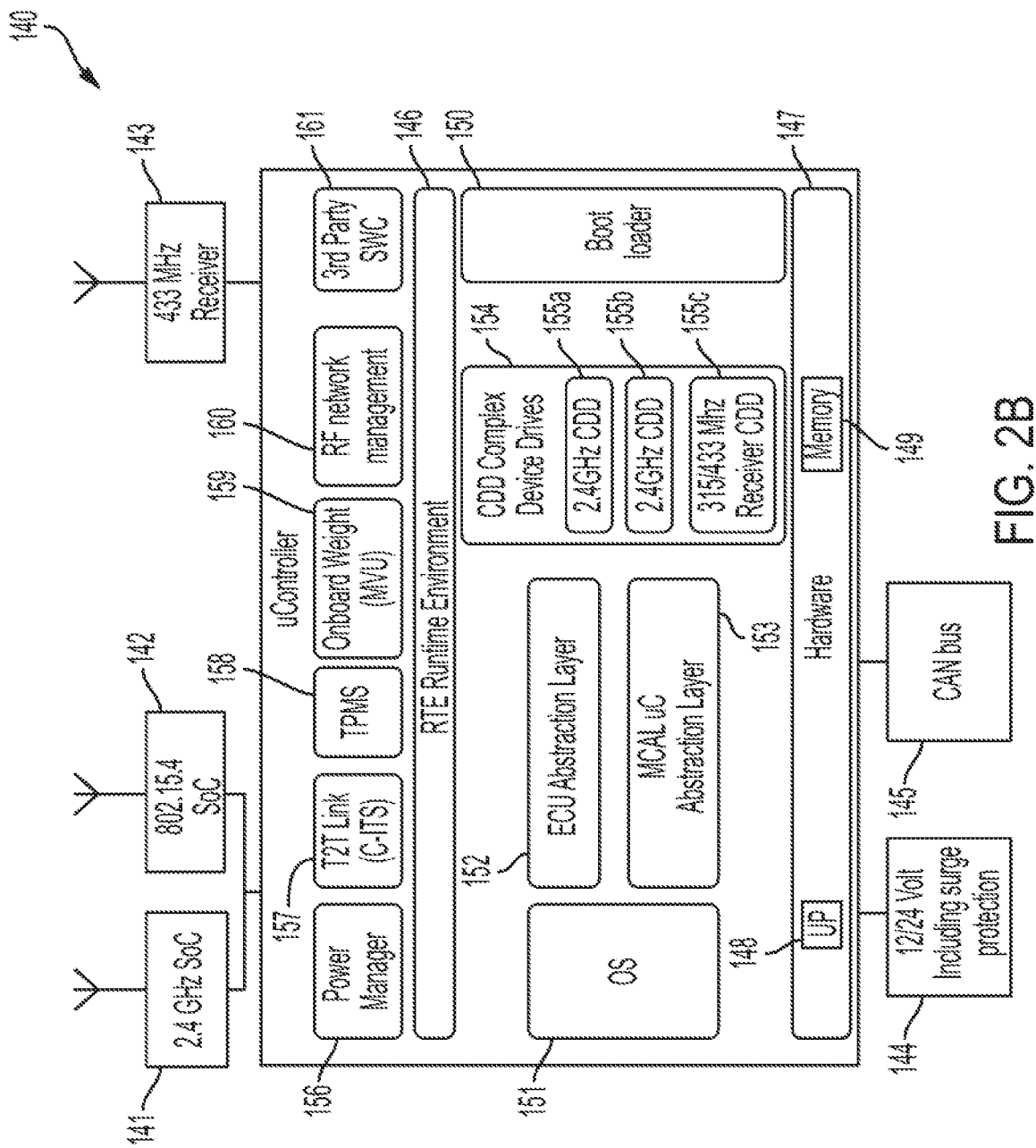
FIG. 2B is a block diagram schematic view of a wireless hub in accordance with the subject technology.

Referring now to FIG. 2B, a schematic diagram of a micro controller 140 suitable for use as a portion of the wireless hub 130 is shown. Typically, the micro controller 140 is part of the PCB 136 of FIG. 2A. The PCB 136 includes additional separate peripheral modules 141, 142, 143, 144, 145 and such may be incorporated into the micro controller 140. The micro controller 140 and modules 141, 142, 143, 144, 145 may include one or more standardly available components or be fabricated as one or more ASICs.

The hubs 130a-d can transmit and/or receive data between other hubs and/or range extenders 170a-d using a WiFi module 141 with a 2.4 GHz frequency band. The WiFi module 141 creates tractor-to-trailer transparent IP-based data communication. A second 802.15.4 thread network protocol communication module 142 can send and receive additional sensor content and range extension. A third communication module 143 can use sub-GHz (e.g., a 433 MHz frequency band) with on-board decode and polling functionality for low power modes. The third communication module 143 is particularly well-suited for data from nearby sensors that are battery powered and, thus, low power.

The micro controller 140 can also be connected for communication to a CAN bus 145, which is typically located in the tractor 102. The micro controller 140 can also be directly connected to another wireless hub 130 so that the hub 130 can act as a radio frequency (RF) to CAN gateway. The PCB 136 also includes a 12/24 V power supply 144 with surge protection to power and protect the micro controller 140 and other components from electrical damage.

When the micro controller 140 is operating, hardware 147 creates a runtime environment (RTE) 146 so that the stored programs are running (e.g., instructions are being executed). The hardware 147 includes a processor 148 coupled to memory 149 along with other components not explicitly shown. Programs are stored in the memory 149 and accessed by the processor 148. A boot loader module 150 allows programming to the memory 148. An operating system module 151 allows the user to interface with the hardware 147. An ECU abstraction layer module 152 facilitates uniform access to the micro controller functions performed by peripherals and application program interfaces (APIs). A MCAL micro controller abstraction layer module 153 facilitates direct access to the devices on the PCB 136. A complex device drive module 154 includes various sub-modules 155a-c to implement drivers for the communication devices 141, 142, 143 as needed. The boot-loader module 150 can run the micro controller 140 for programming and writing information to the memory 149.

As can be seen, the micro controller 140 is specifically designed for use in the VAN 101. The micro controller 140 also includes a power manager module 156 and a Truck to Trailer network link software module 157. The micro controller 140 includes a TPMS module 158 and onboard weight motor vehicle unit module 159 to accomplish TPMS and MVU weight measurements in the VAN 101. The micro controller 140 also includes a RF network management module 160 and a third party software component module 161 to facilitate use of RF network components and third party software. Other modules may be present in the micro controller 140 to accomplish any desired features in the VAN 101. Further, the micro controller 140 features may be expanded by having hardware and software ready to host additional software and support other components (e.g., additional sensors, hubs, subnetworks).

Transmitters/Receivers

Figure 3A:
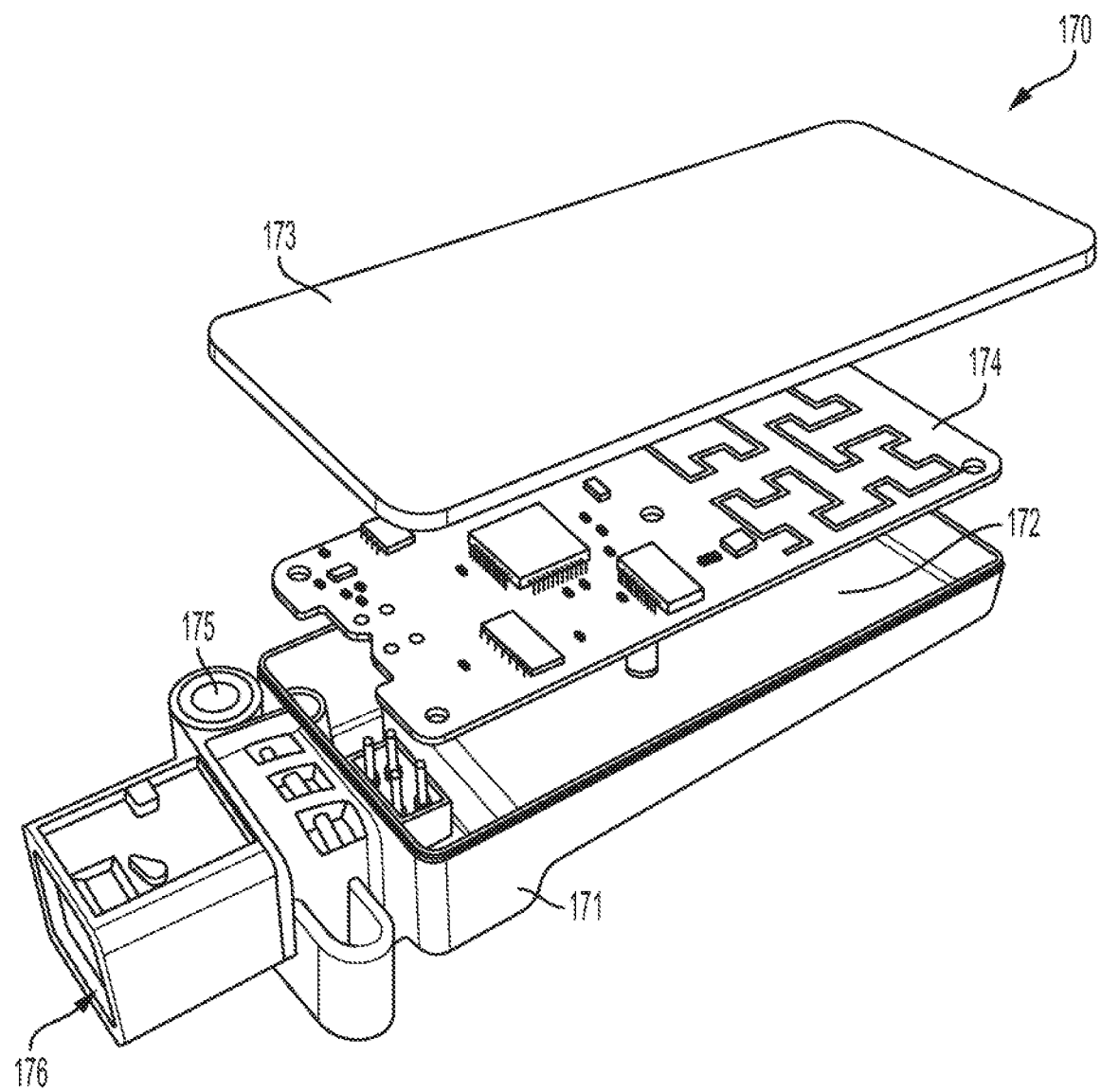
FIG. 3A is an exploded view of a range extender in accordance with the subject technology.
Figure 3B:
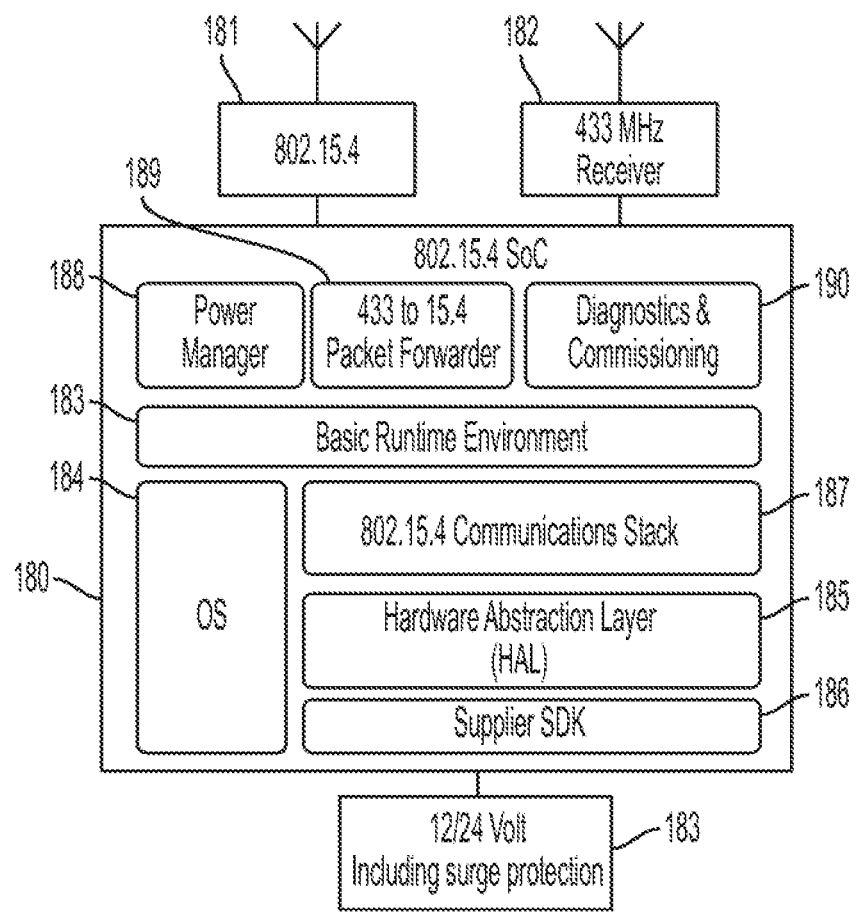
FIG. 3B is a block diagram schematic view of a range extender in accordance with the subject technology.

Referring now to FIGS. 3A and 3B, an exploded view and a schematic view of an exemplary transceiver/receiver 170 are shown, respectively. The transmitter/receiver 170 includes an enclosure 171 forming a cavity 172 that is sealed with a lid 173 for protection of a printed circuit board (PCB) 174. Again, one or more compression limiters 175 fit in the enclosure 171 to maintain the joint integrity of the plastic enclosure 171. The PCB 174 includes the electronics to carry out all the functions of the transmitter/receiver 170 including sending/receiving data, data processing, and storage. The PCB 174 may include a processor, memory, an antenna and other components (not explicitly shown).

For wired connections, the transmitter/receiver 170 includes a connector 176. The transmitter/receiver 170 may be powered by a battery and/or from a wired connection. In one embodiment, the hub 130 is connected to a +12/24V supply 183. The transmitter/receiver 170 is also configured to withstand large temperature changes in the range of –40° C. to +85° C. Preferably, the transmitter/receiver 170 can mount in any suitable location but outside the chassis rail is preferred.

Typically, most, if not all functional modules, are created by components of the PCB 174 but one or more peripheral components 181, 182, 184 could also be utilized. The PCB 174 may include one or more standardly available components or be fabricated as one or more application specific integrated circuits (ASICs). The components of the PCB 174 work together to form a central processing unit 180.

The transmitter/receiver 170 can transmit and/or receive data to hubs and/or other transmitter/receiver 170 using a 802.15.4 thread network protocol communication module 181 as well as send and receive additional sensor content. Thus, the transmitter/receiver 170 can be used to enlarge the size of the VAN 101. A sensor communication module 182 uses sub-GHz (e.g., a 433 MHz frequency band) for low power modes to efficiently work with nearby sensors that are battery powered.

When the transmitter/receiver 170 is operating, a runtime environment (RTE) 183 is created so that the stored programs are running (e.g., instructions are being executed). The PCB 174 may include a processor coupled to memory along with other components not explicitly shown. The programs are stored in the memory and accessed by the processor. One program is an operating system module 184 that allows the user to interface with the hardware 147, typically using the pairing device 275.

A hardware abstraction layer module 185 facilitates uniform access to the range extender functions. A supplier software development kit (SDK) module 186 facilitates creation of applications with advanced features specific to the transmitter/receiver 170 and operating system module 184. The PCB 174 includes a communications stack module 187 to support the 802.15.4 thread network protocol communication module 182.

As can be seen, the transmitter/receiver 170 is specifically designed for use in the VAN 101. The transmitter/receiver 170 includes a power manager module 188 and a packet forwarder module 189 for assisting with data conversion. The transmitter/receiver 170 also includes a diagnostic and commissioning module 190 that provides a user interface via the smart device 275 for start-up and troubleshooting purposes. Other modules may be present in the transmitter/receiver 170 to accomplish any desired features in the VAN 101. Further, the transmitter/receiver 170 features may be expanded by having hardware and software ready to host additional software and support other components.

The transmitter/receiver 170 is particularly beneficial when retrofitting technology on to an existing trailer or tractor for future incorporation into a vehicle area network. The transmitter/receiver 170 may connect to various sensors, wired or wirelessly, then pass along the data to a wireless hub. In effect, the transmitter/receiver 170 is the additional hardware to bridge communications with existing hardware to the new networked components.

Tire Pressure Monitor System

Further, the sensors may also be retrofit. For example, see U.S. patent application Ser. No. 16/119,109 filed on Aug. 31, 2018 entitled TIRE PRESSURE MONITOR WITH VARIABLE ANGLE MOUNTING, which is incorporated herein by reference. In addition to sensors indicating the tire pressure, the sensors may auto-locate or be programmed to indicate wheel position. As such, when the VAN 101 identifies a pressure reading, the pressure reading is associated with a specific tire. The tire-related data can include temperature data as well, which is also an indication of proper and improper performance.

It is envisioned that the smart device 275 can be used to assist in refilling tire pressure alleviating the need for a tire pressure gauge by having the pressure reading on the smart device 275 or other indicia, such as beeping the horn/flashing the lights, to indicate that the pressure is within specification. If the tire is equipped with automatic tire fill, the VAN 101 can trigger refill and stop at the desired pressure. The sensors can also provide an indication that the lift axle is lowered but the tire is not turning. In this instance, a tire lock warning could be generated and/or acted upon such as in an autonomous vehicle. Similarly, a tire blow out can be detected quickly after the burst event to send a warning indicating the blow out and location. In the self-driving vehicle, the tire burst warning generates a reaction for safety and control. Preferably, the sensors are battery powered with efficient power usage for long life.

Beacons

Figure 4A:
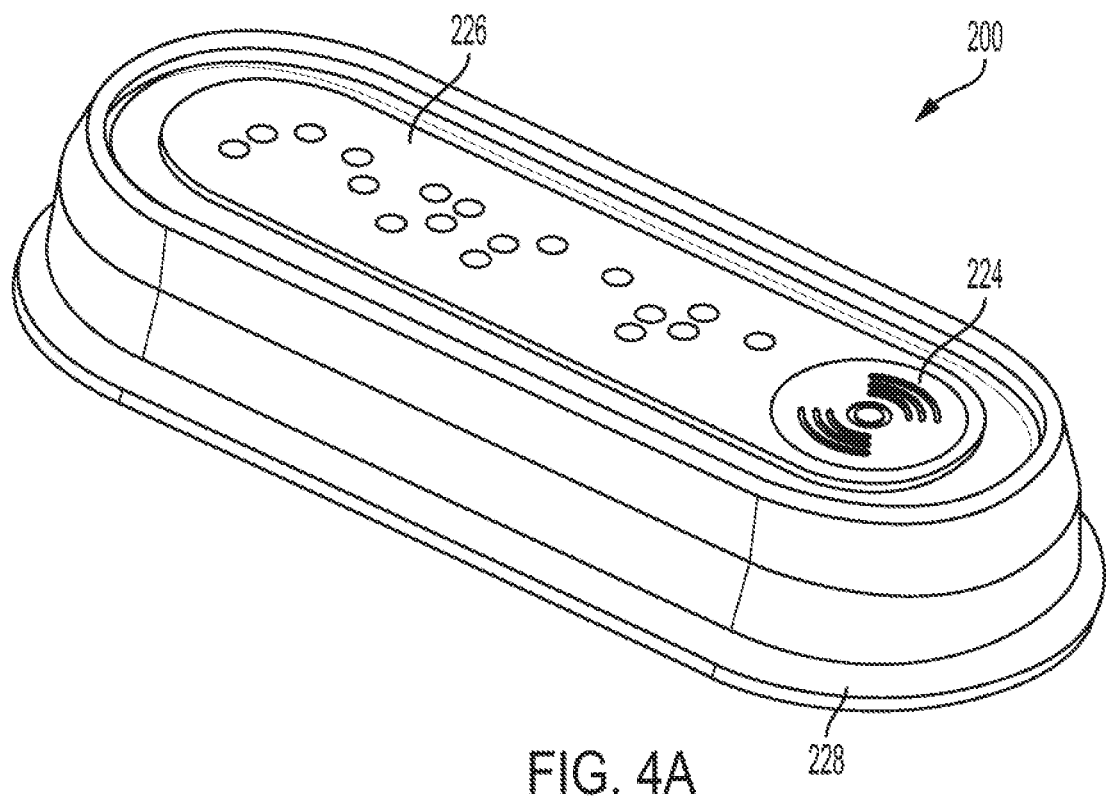
FIG. 4A is a perspective view of a beacon in accordance with the subject technology.
Figure 4B:
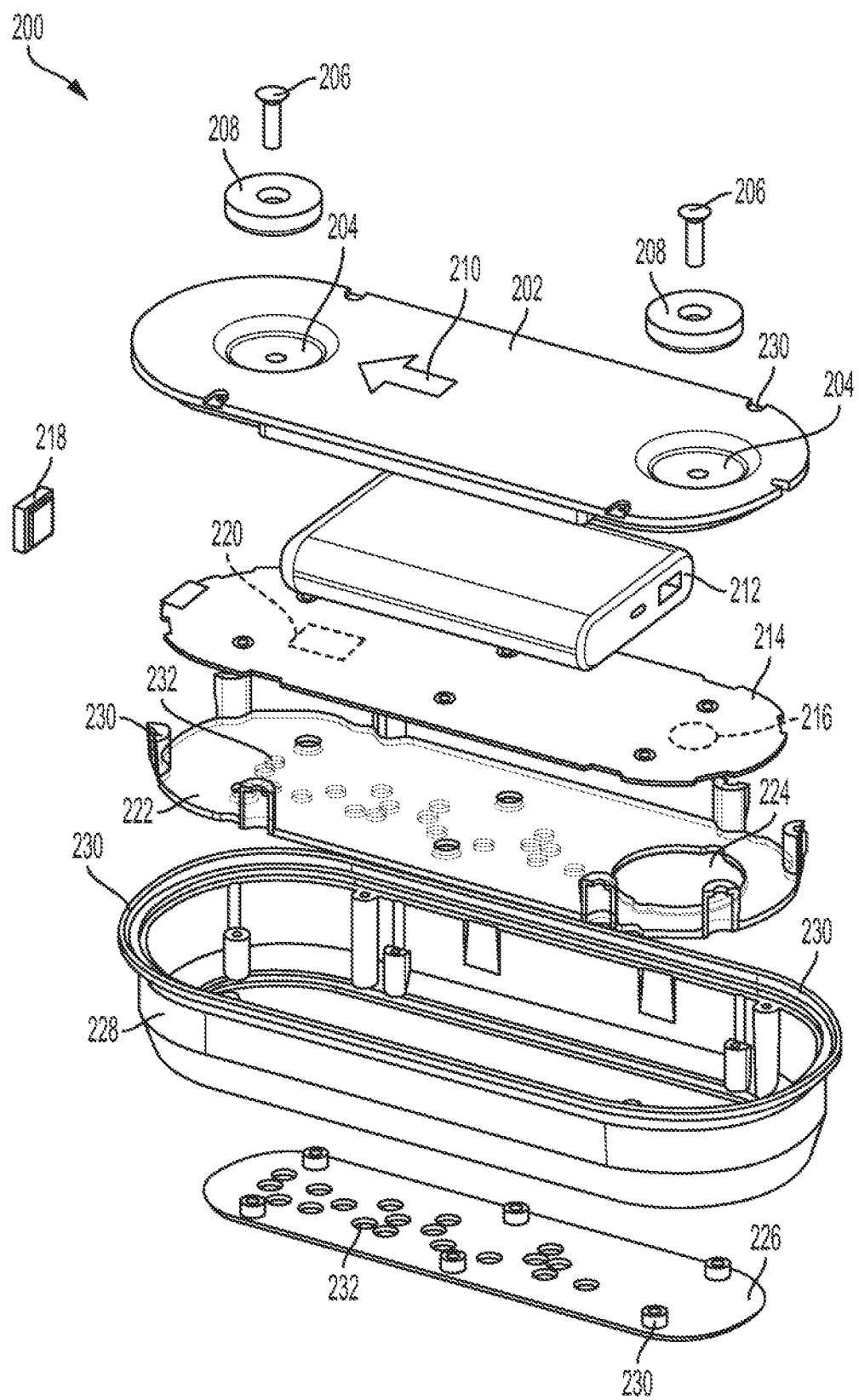
FIG. 4B an exploded view of a beacon in accordance with the subject technology.

Referring now to FIGS. 4A and 4B, a perspective and a bottom exploded view of a beacon 200 in accordance with the subject technology is shown. The beacon 200 may mount to the trailer 104a magnetically, with a bracket or by any other fastener. A bottom plate 202 forms two recesses 204. Screws 206 hold magnets 208 in the recesses 204 so that the beacon 200 can simply be placed against the trailer 104a for mounting and easily removed without tools for wireless charging, relocation, repair and the like. The bottom plate 202 has an indicia arrow 210.

The beacon 200 also includes a rechargeable battery 212 for a power source. A printed circuit board (PCB) 214 has an LED 216 (shown in dashed lines) that illuminates to show such information as the status of the trailer 104a (e.g., connected to the VAN 101 (e.g., solid light) or in process of being connected (e.g., flashing light)). The PCB 214 also has components to wirelessly communicate with the hubs 130a-d and or transmitter/receivers 170a-d. The PCB 214 is also equipped to interface with a smart device 218 that can use near-field communication (NCF). The PCB 214 also has a GPS module 220 (shown in dashed lines) so that the VAN 101 can locate the beacon 200, and in turn the trailer 104a at a great distance as described above. The beacon 200 also has a PCB top plate 222 for protecting the PCB 214. The PCB top plate 222 has a translucent window 224 aligned with the LED 216. A top cover 226 couples to the bottom plate 202 to seal the battery 212, PCB 214 and PCB top plate 222 within an oval housing 228. Preferably, the top cover 226, bottom plate 202, PCB 214, PCB top plate 222 and oval housing 228 have features 230 for screwing together. The PCB top plate 222 and top cover 226 also have a plurality of aligned holes 232.

Multi-Trailer Ordering

Figure 5:
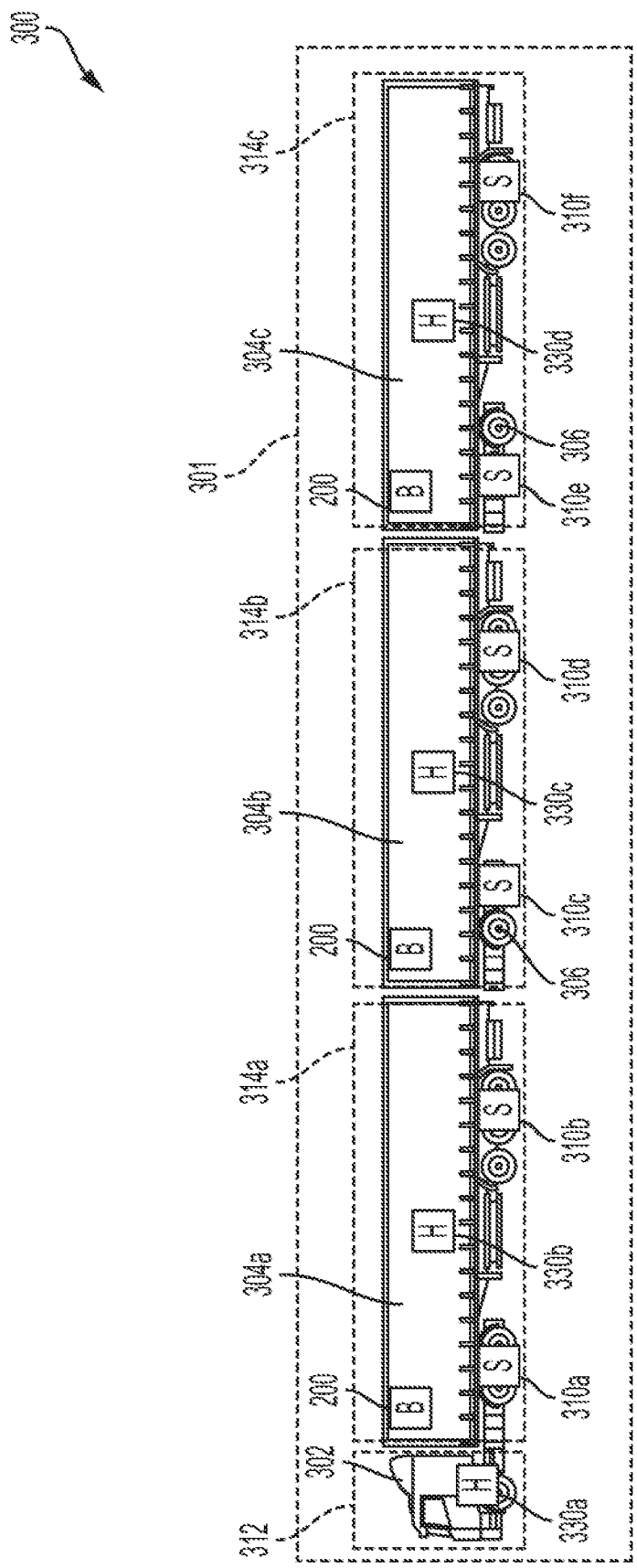
FIG. 5 is another exemplary tractor-trailer vehicle utilizing a vehicle area network in accordance with the subject technology.

Referring now to FIG. 5, another exemplary vehicle area network (VAN) 301 for a tractor-trailer vehicle 300 is shown. The components and functionality of the VAN 301 and tractor-trailer vehicle 300 can be similar to the vehicle 100 and VAN 101 described above, except as otherwise indicated herein. Thus, like reference numerals in the "3" series represent similar components. For clarity, several components are not shown.

The vehicle 300 includes a tractor 302 with three trailers 304a-c and two dollies 306, all including components similar to those discussed with respect to FIG. 1. The VAN 301 allows for communication between all of the components of the vehicle 300, such as wireless hubs 330a-d, sensors 310a-f (e.g., TPMS, pressure sensors, temperature sensors and the like), beacons 200, and the like, as discussed above. The tractor 302 and each trailer 304a-c have a corresponding subnetwork 314a-c within the VAN 301 which connects the components proximate the respective trailer 304a-c. Although not shown, it is envisioned that the VAN 301 includes transmitter/receivers and other components as desirable for robust performance. Each trailer 304a-c also includes a beacon 200 for assisting the driver in assembling the vehicle 300.

It is advantageous for the VAN 301 to be informed of the relative location of the trailers 304a-c and/or subnets 314a-c established on the vehicle 300. The VAN 301 having the relative location helps to identify where various sensors, and other components such as the tires, are located. In some cases, it can be a challenge for the VAN 301 to identify the exact ordering of the trailers 304a-c. Further, even if this is manually calibrated, trailers are often dropped off, and new trailers picked up and attached to the truck, requiring the new trailers to be ordered within the VAN 301. Therefore, it is advantageous for the VAN 301 to be capable of connecting to and establishing communication with trailers automatically and determining an order of the trailers.

Referring now to FIGS. 6A-6D, a flowchart 600 of a method for automatically recognizing the order of three trailers 304a-c on the vehicle 300 is shown. The method relies on data, including signal strength and time of flight (ToF) to continuously monitor and update the status of the vehicle 300. The flowchart herein illustrates the structure or the logic of the present technology, possibly as embodied in computer program software for execution on by the hardware described herein. Those skilled in the art will appreciate that the flowchart illustrates the structures of the computer program code elements, including logic circuits on printed circuit boards having integrated circuits that function according to the present technology. As such, the present technology may be practiced by a machine component that renders the program code elements in a form that instructs a digital processing apparatus (e.g., micro controller or computer) to perform a sequence of function step(s) corresponding to those shown in the flowchart.

At step 602, the method starts with the micro controller of each hub 330a-d being powered up and in normal operation to form the respective subnetworks 312, 314a-c but, at this time, the trailer order is unknown and the trailers 304a-c can be in any order. At step 604, each subnetwork 312, 314a-c monitors received signal strength indicators (RSSI) and ToF data from all other subnetworks 312, 314a-c. If other hubs were not present, the same data could come from range extenders or even directly from sensors.

At steps 606 and 608, the tractor hub 330a identifies a trailer subnetwork 314a with the highest RSSI and the shortest ToF. The trailer subnetwork 314a with the highest RSSI and shortest ToF should be the lead trailer 304a physically closest to the tractor 302. At step 610, the tractor hub 330a compares the subnetwork 314a identified with the highest RSSI to the subnetwork 314a with the shortest ToF. If the subnetworks of steps 606 and 608 do not match, meaning the subnetwork with the highest RSSI is different from the subnetwork with the shortest ToF, the method restarts at step 602. At step 612, if there is a match by both being subnetwork 314a, subnetwork 314a is identified as being on the first trailer 314a (e.g., the lead trailer). Further, if at step 610, there is only an RSSI and ToF from the same subnetwork 314a, then the tractor subnetwork 312 can identify the associated trailer 304a as the one and only trailer present.

After the lead trailer 304a is identified successfully, the lead trailer wireless hub 330b identifies the subnetwork 314b with the highest RSSI and the shortest ToF with respect thereto, excluding the tractor subnetwork 312 in both cases at steps 614 and 616. At step 618, if there is a match, then the respective subnetwork 314b is identified as the second trailer 304b immediately after the lead trailer 304a at step 620 as shown on FIG. 6b. If there is no match at step 618, the method restarts at step 602. In another embodiment, the method restarts at step 612 by using the previously established lead trailer identification. If at steps 614 and 616, there are only an RSSI and ToF from two subnetworks 314a, 314b, then the tractor subnetwork 312 can identify and order the associated two trailers 304a, 304b. In one embodiment, the process end after successful identification at step 620.

Once the second trailer 304b is identified, any of the hubs 330a, 330b or the trailer wireless hub 330c of the second trailer 304b can identify the third trailer 304c. To that end, in the following description the second trailer wireless hub 330c is used. At steps 622 and 624, the hub 330c identifies the subnetwork 314c with the highest RSSI and the shortest ToF excluding the tractor subnetwork 312 and the lead trailer subnetwork 314a in both cases. At step 626, if there is a match, it is assumed the identified subnetwork 314c corresponds to the third trailer 304c (i.e. the trailer 304c immediately after the second trailer 304b). The third trailer 304c is identified at step 628 based on the third trailer subnetwork 314c, as shown on FIG. 6b. If there is no match at step 626, the entire process is restarted at step 602 but may alternatively return to step 620.

The steps to identify the next trailer in a line of trailers can be repeated for additional trailers, as would be understood by one of skill in the art. Assuming the vehicle 300 has three trailers 304a-c, as in the example of FIG. 5, the first results ordering the three trailers 304a-c have then be determined at step 630, which indicate an initial order of all the trailers 304a-c. If at steps 622 and 624, there are only an RSSI and ToF from three subnetworks 314a-c, then the tractor sub- network 312 can identify and order the associated three trailers 304a, 304b and end the method or proceed with a double check as follows. For more trailers, the method may continue.

After step 630 to double check, the process of determining the order of the trailers 304a-c is then substantially repeated, in reverse order, to get a second set of results for comparison to determine whether the initial ordering was accurate. In more detail, referring now to FIG. 6c, the method continues to monitor RSSI and ToF data from all other subnetworks 314a-c at step 632. At steps 634 and 636, starting with the identified third trailer 304c, the third trailer subnetwork 314c identifies the subnetwork 314b with the highest RSSI and the shortest ToF by comparing data from all of the identified subnetworks 312, 314a-b. At step 638, subnetwork(s) with the highest RSSI and the shortest ToF are compared. If the identified subnetworks with the highest RSSI and the shortest ToF are different, the method restarts to step 632, but if there is a match, then the identified subnetwork 314b is determined to correspond to the second trailer 304b. The identification of location of the second trailer 304b is saved as part of the second set of results at step 640.

At steps 642 and 644, the newly identified second trailer subnetwork 314b then identifies the highest RSSI and the shortest ToF excluding the third trailer subnetwork in both cases. At step 646, the second trailer subnetwork 314b compares the identified subnetworks, typically subnetwork 314a for each criteria. If there is a match, then the identified subnetwork (e.g., subnetwork 314a) is determined to correspond to the lead trailer 304a and saved as part of the second set of results at step 648. If the identified subnetworks are different at step 646, the method restarts at step 632.

Figure 6A:
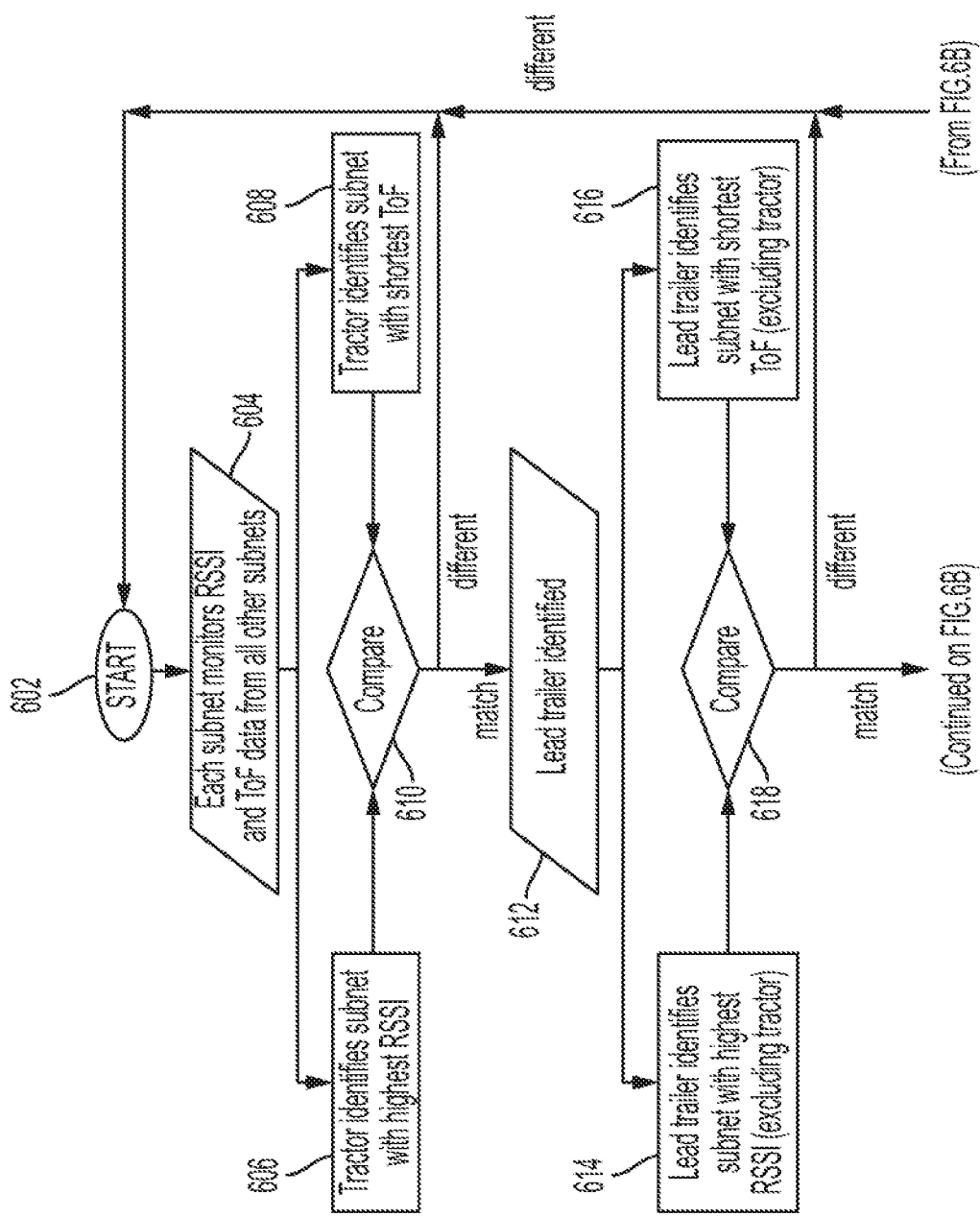
FIG. 6A is a portion of a flowchart for automatically ordering the trailers of the vehicle of FIG. 5 in accordance with the subject technology
Figure 6B:
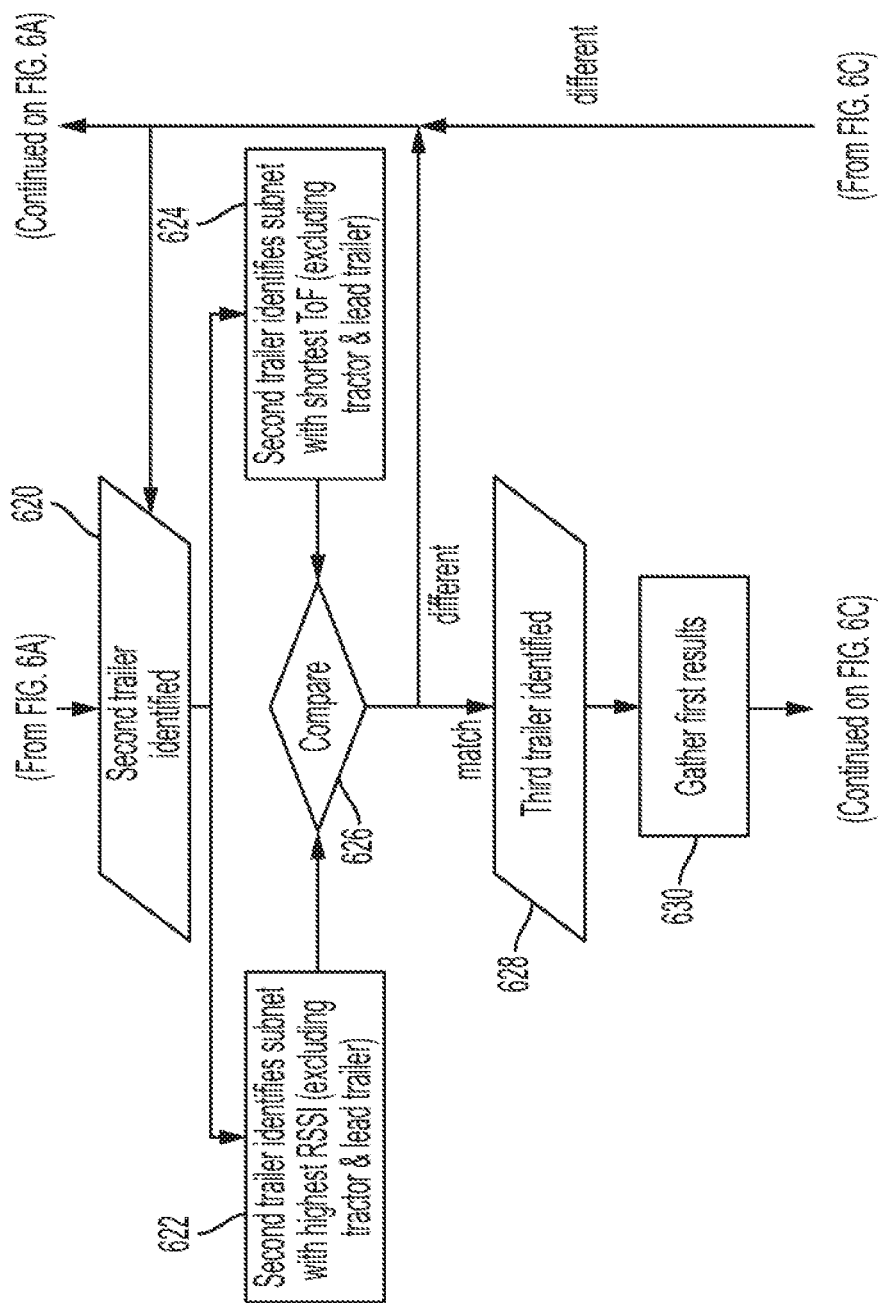
FIG. 6B is a portion of a flowchart for automatically ordering the trailers of the vehicle of FIG. 5 in accordance with the subject technology.
Figure 6C:
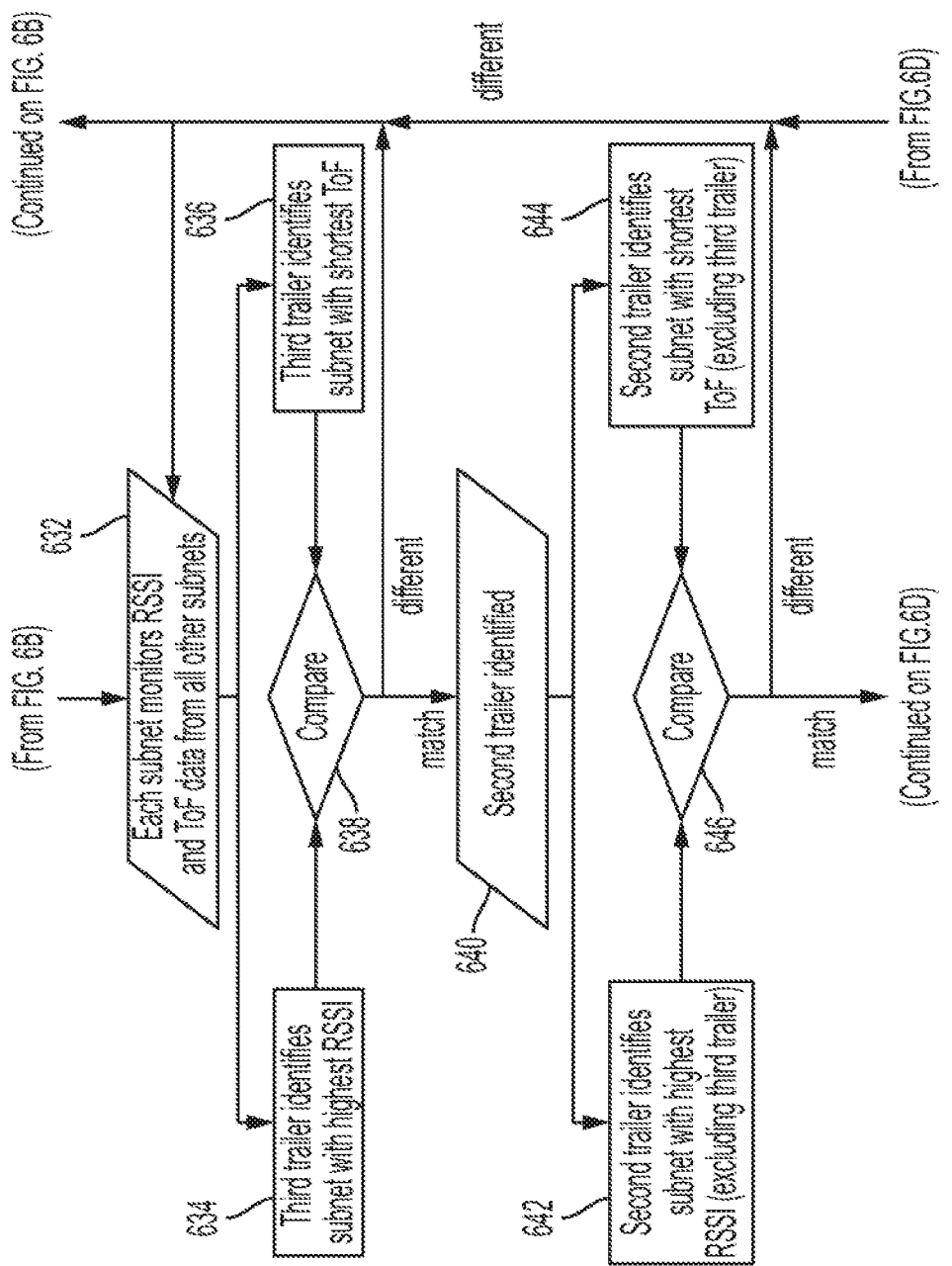
FIG. 6C is a portion of a flowchart for automatically ordering the trailers of the vehicle of FIG. 5 in accordance with the subject technology
Figure 6D:
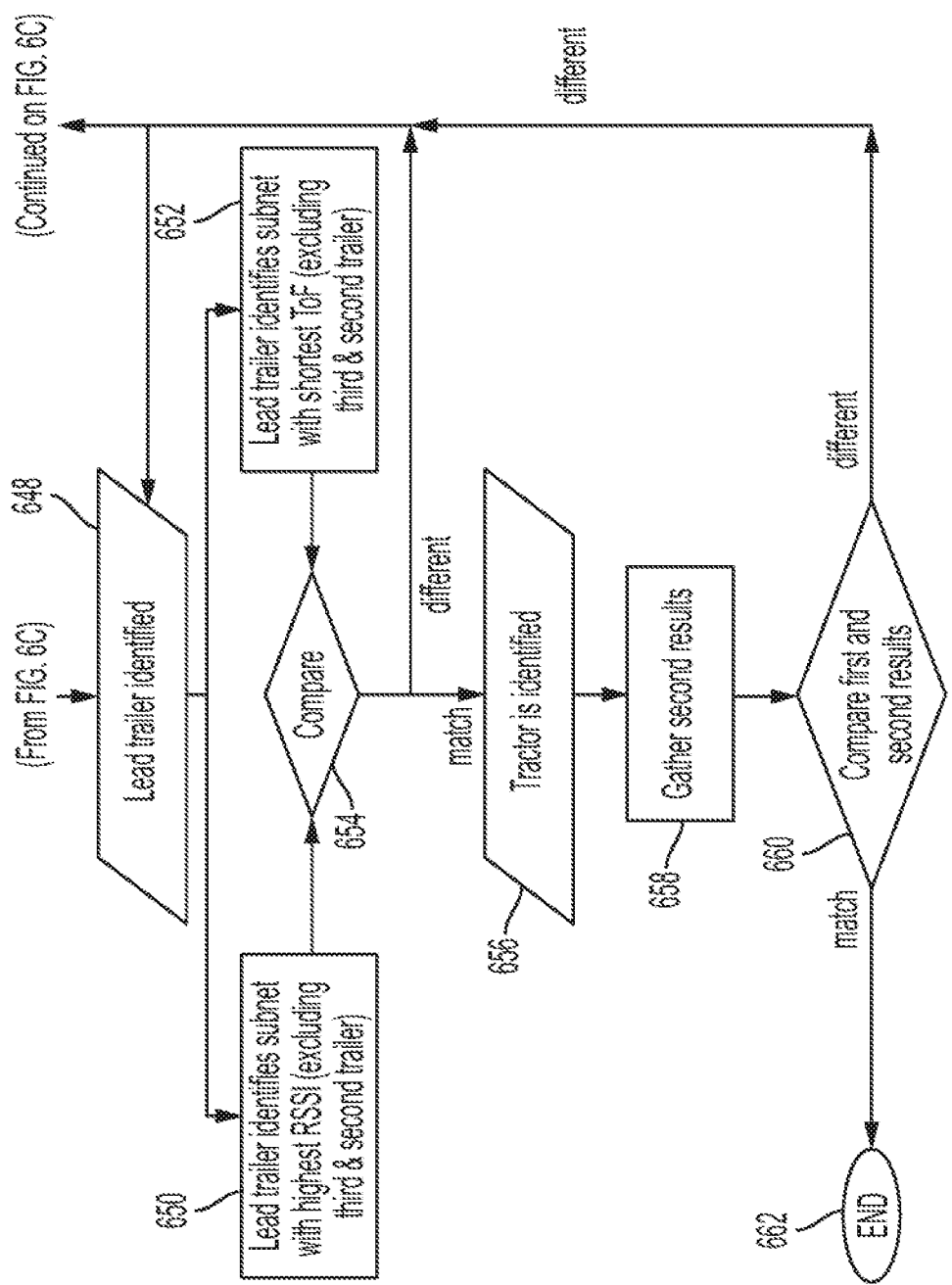
FIG. 6D is a portion of a flowchart for automatically ordering the trailers of the vehicle of FIG. 5 in accordance with the subject technology.

Referring now to FIG. 6d, the identified lead trailer subnetwork 314a then identifies the subnetwork with the highest RSSI and with the shortest ToF excluding the second and third trailer subnetworks 314b-c, in both cases at steps 650 and 652. At step 654, the lead trailer subnetwork 314a compares the identified subnetworks. If there is a match, properly being the tractor subnetwork 312, then the method proceeds to step 640 where the identified tractor subnetwork 312 is determined to correspond to the tractor 302. The method gathers and saves the information related to the three properly located subnetworks 312, 314a-b as part of the second set of results at step 658.

At step 660, with the subnetworks 312, 314a-b identified and ordered a second time, the first and second set of results are then compared. If the ordering determined in the first set of results is consistent with the ordering determined in the second set of results, then it is verified that order of the VAN subnetworks 312, 314a-c have been correctly determined and the method ends at step 662. Otherwise, if the order determined in the first and second set of results is different, then the method starts over at step 602 so a verified order can be determined.

In this way, the VAN 301 is able to automatically determine an order of the trailers 304a-c based on the order of the subnetworks 330b-d with no input from the user. The order of the trailers 304a-c can then be relied upon to determine where various sensors are located, and to easily take action based on a sensor readings and/or alert. For example, if a tire pressure monitoring sensor reports data that triggers a low pressure alert, it is advantageous for the user to be able to narrow down the potential tire(s) corresponding to that alert. A given sensor's subnet can be used to determine which trailer (or tractor) the sensor is a part of, based on the ordering of the trailers with no additional input needed from the user. Thus, if the pressure sensor reporting the alert is in the third trailer subnetwork 314c, the user can be alerted that a tire of the third trailer 304c has low pressure. This avoids the need for the user to spend time checking the tires for the tractor 302 or the other trailers 304a-b. This can be similarly used for readings and alerts for other known sensors as are known in the art.

It is also envisioned that the dollies 306 can have wireless hubs that form separate subnetworks rather than part of the trailer subnetworks 314b-c, respectively. In this instance, the dolly subnetworks would be similarly identified and ordered in the method of ordering the subnetworks. The process described herein can use shared specifications for standardized information. The shared specifications allow the process of linking trailers to the VAN 101, 301 and ordering the trailers to be easily carried out across multiple truck and trailer brands. Preferably, no secondary user action is required to determine the ordering of the trailers 104, 304. For example, the method for ordering the trailers 104, 304 can be activated upon making the electrical and/or pneumatic connections between the tractor 102, 302 and the trailers 104, 304, as well as between the trailers 104, 304. The method can also be triggered by using the smart device 275.

Figure 7B:
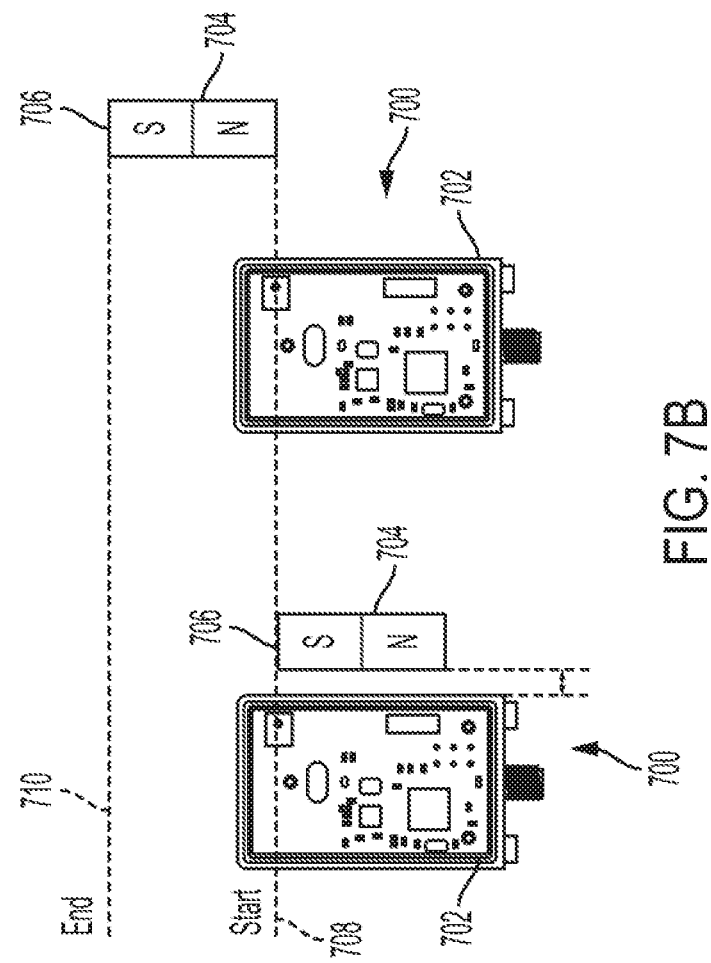
FIG. 7B is two side-by-side overhead views of the sensor arrangement of FIG. 7A in an initial installation orientation and an after full brake wear orientation to illustrate how the target portion moves.
Figure 7A:
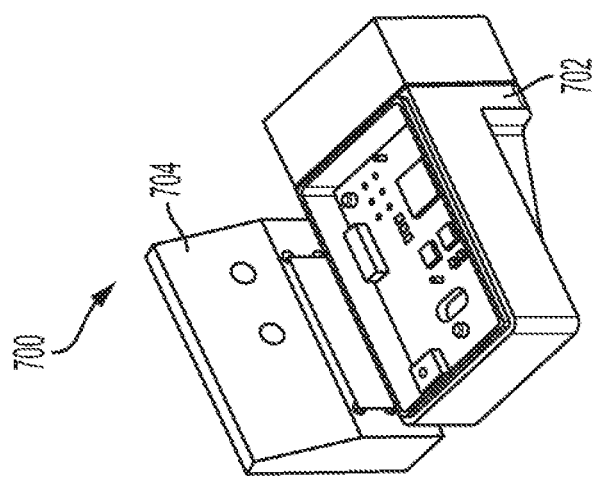
FIG. 7A is a perspective view of a sensor arrangement in accordance with the subject technology.

Referring now to FIG. 7A-20E, various brake and sensor arrangements are shown. The sensor arrangements can be incorporated into the VAN 101 of FIG. 1, as described above. Referring to FIGS. 7A and 7B, a sensor arrangement 700 is shown. The sensor arrangement 700 includes a stationary sensor portion 702 and a moving target portion 704. The portions 702, 704 are mounted to the brake assembly with the sensor portion 702 fixed to a casting or other stationary feature whereas the target portion 704 is mounted on a moving feature. Thus, as brakewear occurs and the brakes are engaged, the target portion 704 moves with respect to the sensor portion 702 commensurate with the brakewear and, in turn, the signal from the sensor portion 702 varies to indicate wear. The sensor arrangement 700 can be mounted in preset cast location, retrofit on existing assemblies, integrally fabricated with the braking assembly, and combinations thereof. Generally, the sensor arrangement 700 is not integrated with a consumable portion so that by being battery powered, the sensor arrangement 700 can perform measurements after many other consumable parts (e.g., brake pads) have been replaced many times. It is envisioned that the sensor arrangement 700 may require calibration during replacement of parts.

Typically, the range of motion of the target portion 704 is limited so that calibration and proper positioning is required so that a leading edge 706 of the target portion 704 is aligned with a start of travel line 708 with no wear. As maximum brakewear approaches, the leading edge 706 approximately aligns with an end of travel line 710 or less.

Figure 8A:
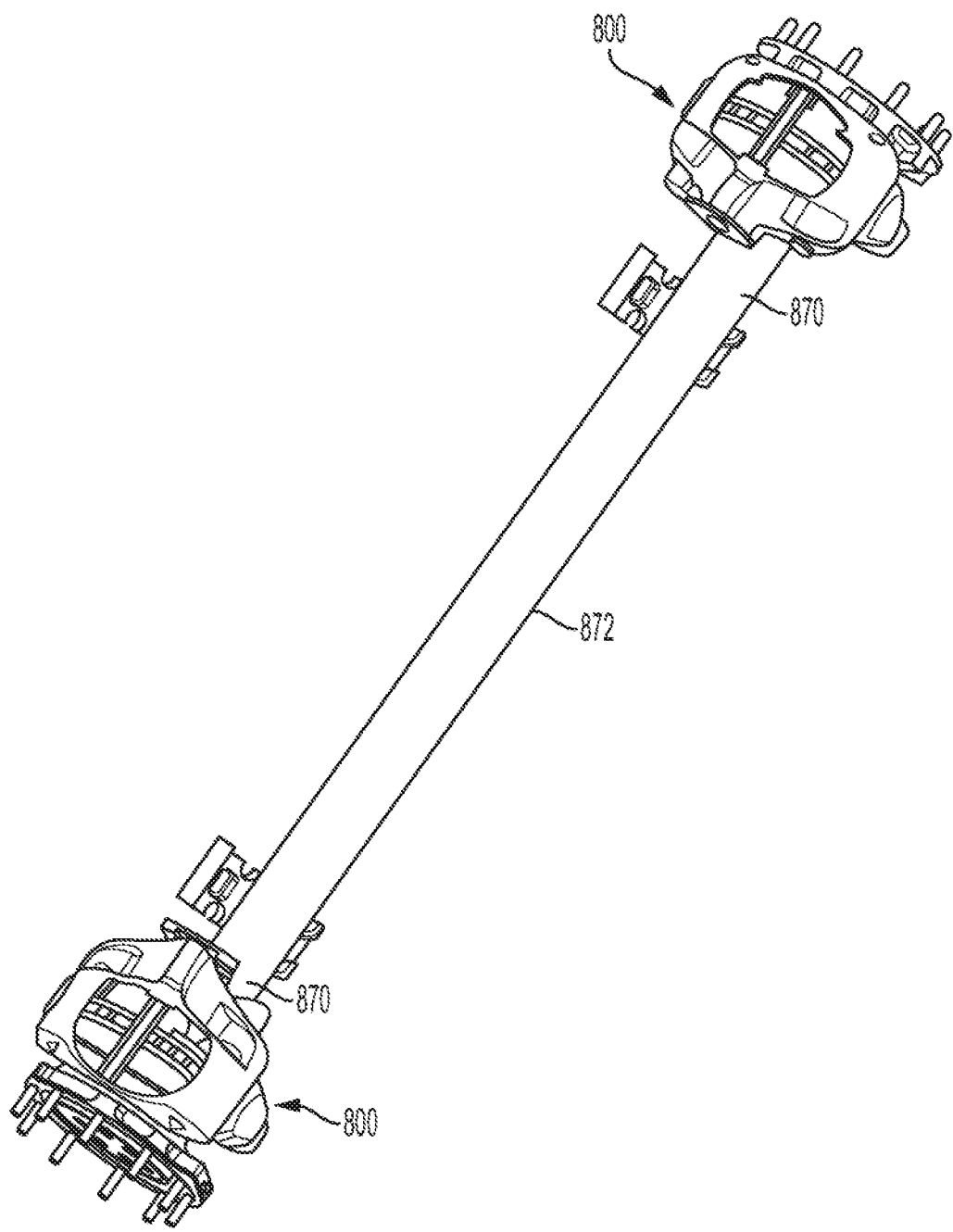
FIG. 8A is a perspective view of an axle with a brake system having a brake sensor assembly in accordance with the subject technology.
Figure 8C:
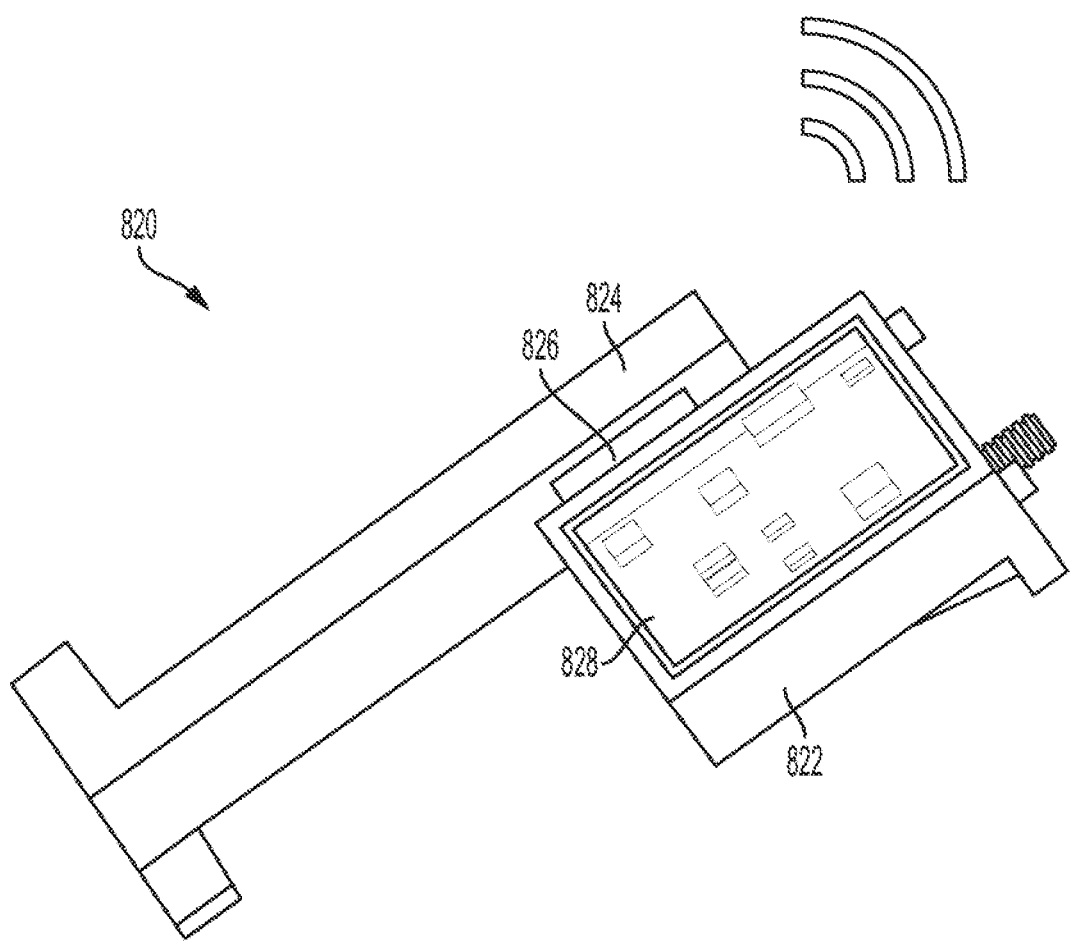
FIG. 8C is an isolated view of a brake sensor assembly in accordance with the subject technology.

Referring now to FIGS. 8A-C, a floating caliper brake system 800 with a sensor assembly 820 is shown. The brake system 800 is on each end 870 of an axle 872. When the brakes are applied, a floating caliper 802 moves in a linear direction parallel to motion arrow 804 with respect to a fixed carrier 806 to force brake pads against a wheel (not distinctly shown). The sensor assembly 820 (shown in isolation in FIG. 8C), includes a fixed sense element 822 and a moveably mounted target portion 824. The target portion 824 includes a magnet 826 while the sense element 822 includes an anisotropic magnetic resistivity (AMR) sensor on a printed circuit board (PCB) 828 that detects a magnetic field based on the positioning of the magnet 826.

In the example given, the sense element 822 is attached to the carrier 806 while the target 824 is attached to the floating caliper 802. When the brakes are applied, the floating caliper 802 moves and the target 824, which is positioned to move parallel to the fixed sense element 822, such that the target 824 changes position and/or angle with respect to the sense element 822. The movement of the target 824 is measured by the sense element 822 and reported to a subnetwork, wireless hub and/or VAN.

The brake pad thickness and/or wear can then be determined based on the measured movement and the range of motion between the floating caliper 802 and carrier 806. Measurements from sensors across the vehicle can be matched up with the corresponding location on the vehicle to determine brake pad thickness at various locations. Brake pad thicknesses can be analyzed within the VAN to compute remaining pad thickness and compare that thickness to regulatory allowances.

If the thickness of a brake pad falls below an acceptable level, a warning can be generated within the tractor for the driver, thereby identifying a particular brake pad that needs replacing. Further, the data from one or more sensors can be used to verify a new brake pad from the initial offset measured when the brakes are applied or for wheel-to-wheel comparisons. For example, excessive wear on a single wheel may indicate a sticking caliper so that a maintenance check can be scheduled. Measurements can be stored and analyzed to determine a wear rate and overall slope of brake pad wear over time. Based on the data, maintenance reminders and scheduling is done automatically. Changes in wear rate or slope can be indicative of fault conditions with a given brake, correlated to driver behavior, or attributable to a change in primary driving conditions, and corresponding warnings can be issued to the driver and/or the fleet manager. The positioning of the sense element 822 and target portion 824 could also be reversed, with the sense element 822 attached to the floating caliper 802 while the target portion 824 is attached to the carrier 806.

Figure 9A:
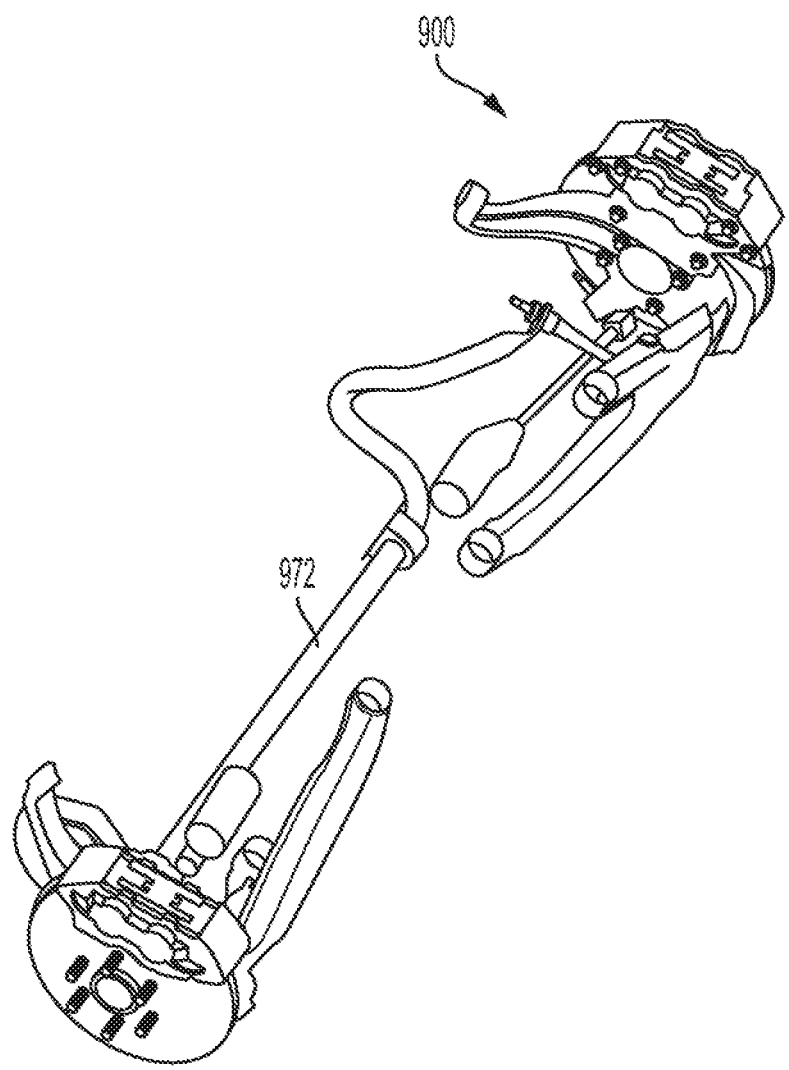
FIG. 9A is a perspective view of an axle with a brake system having a brake sensor assembly in accordance with the subject technology.
Figure 9B:
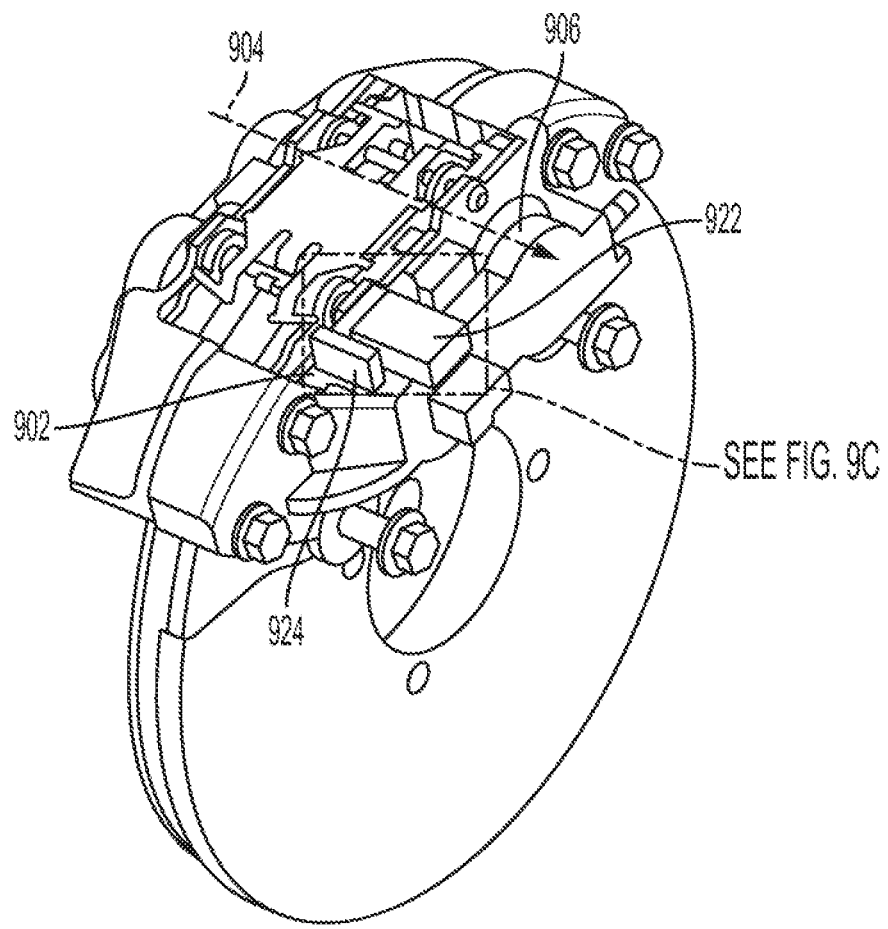
FIG. 9B is a detailed perspective view of a brake system having a brake sensor assembly in accordance with the subject technology.
Figure 9C:
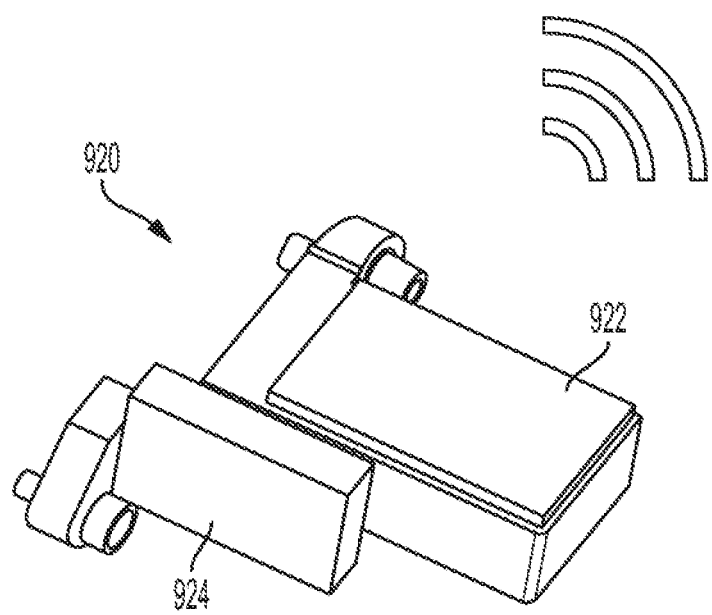
FIG. 9C is an isolated view of the brake sensor assembly of FIG. 9B.

Referring now to FIGS. 9A-C, another brake system 900 with a sensor assembly 920 is shown. The brake system 900 is shown on an axle 972 in FIG. 9A. The brake system 900 is a fixed caliper brake system where the brake pad 902 moves with respect to the fixed caliper 906 shown in more detail and isolation in FIG. 9B. Therefore, the sense element 922 can be attached to the fixed caliper 906 with the target portion 924 attached to the brake pad 902, or the support structure around the brake pad, to move linearly as the brake pad 902 moves. Alternatively, the sense element 922 could be attached to the brake pad 902 and the target portion 924 attached to the fixed caliper 906. Again, the signal from the sense element 922 may be wirelessly transmitted. Further, the brake system 900 is separate from consumable components and battery powered so that other than possibly needing recalibration, the brake system 900 may last for the life of the vehicle. The calibration of the brake system 900 is preferably performed automatically or by using a smart device in communication with the vehicle area network.

Figure 10D:
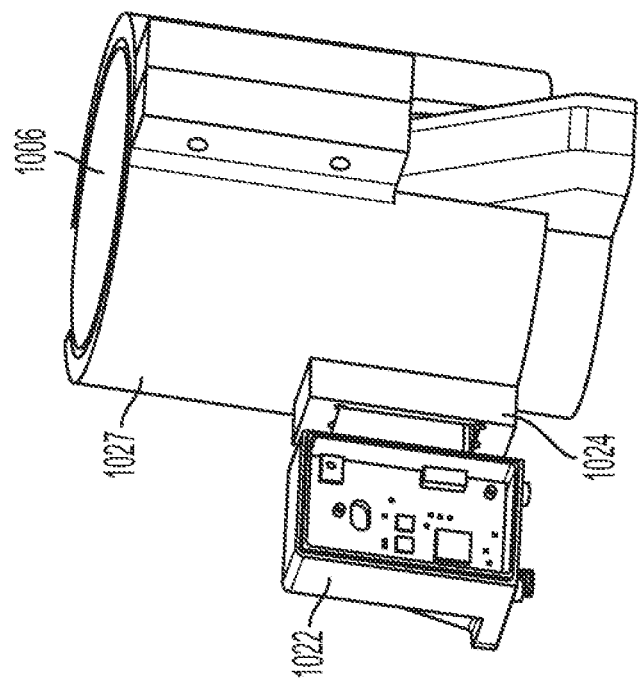
FIG. 10D is a model view of a deployed brake sensor assembly in accordance with the subject technology.
Figure 10C:
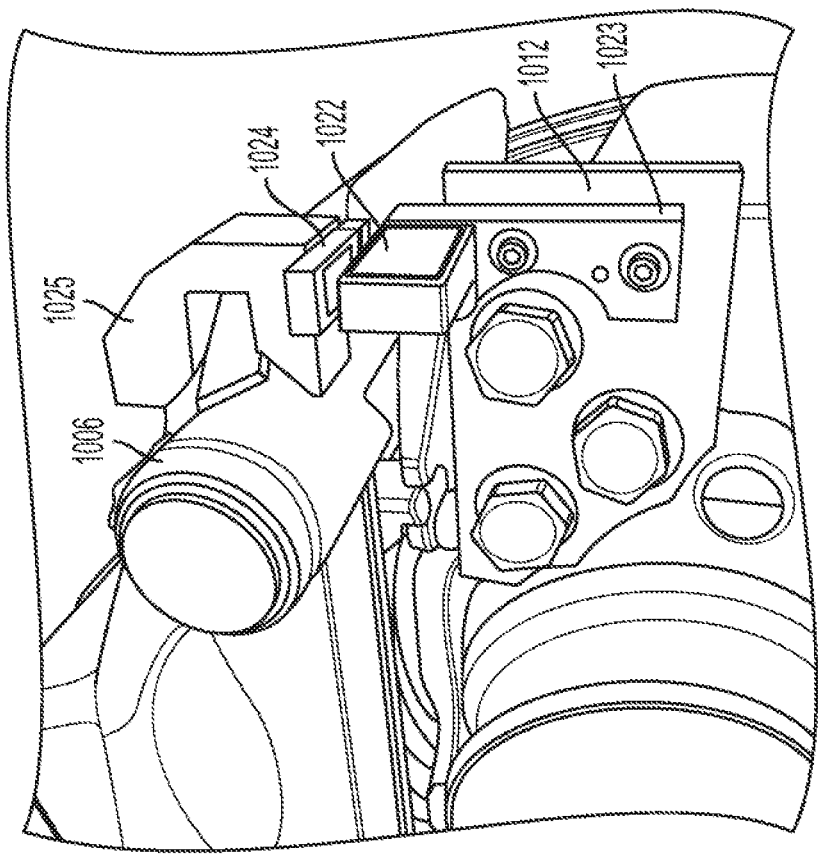
FIG. 10C is a detailed perspective view of a brake system having a brake sensor assembly in accordance with the subject technology.
Figure 10E:
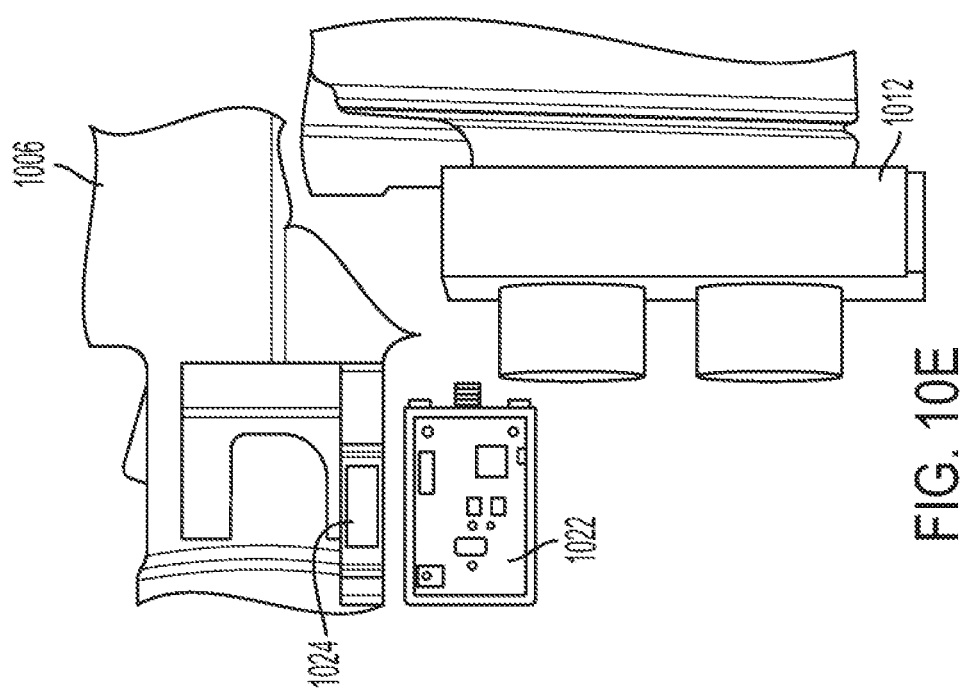
FIG. 10E is a partial view of a deployed brake sensor assembly in accordance with the subject technology.

Referring now to FIGS. 10A-E, FIG. 10A is a perspective semi-exploded view of a disc brake system 1000 in accordance with the subject technology. FIG. 10B is a different perspective semi-exploded view of the disc brake system 1000. FIGS. 10C-E are detailed views of a brake sensor assembly 1020.

The disc brake system 1000 includes a stationary mounting plate 1002. Preferably, the sensor element 1022 can be mounted to an attachment plate 1012 (see FIG. 10C), which can in turn be attached to the stationary mounting plate 1002 at location 1003. The target portion 1024 mounts on a floating portion of the caliper 1110, thereby moving with the pads as the pads wear during braking. A preferred location for mounting the target portion 1024 is a circular projection 1006. As can be seen in FIG. 10C, the sense element 1022 and the target portion 1024 can be retrofit by using brackets 1023, 1025, respectively. Alternatively, in FIG. 10D, the target element 1024 is integrated into the casting 1027. For example, the casting 1027 is part of the circular projection 1006.

Referring now to FIGS. 11-20E, other brake systems and brake sensor assemblies are shown. The systems and sensor assemblies can work as described with respect to systems and sensor assemblies above, except as otherwise described herein. In particular, the brake systems in FIGS. 11-20E are drum brake systems, and all sensor assemblies shown therein are configured for use with a drum brake system as described below.

Figure 11:
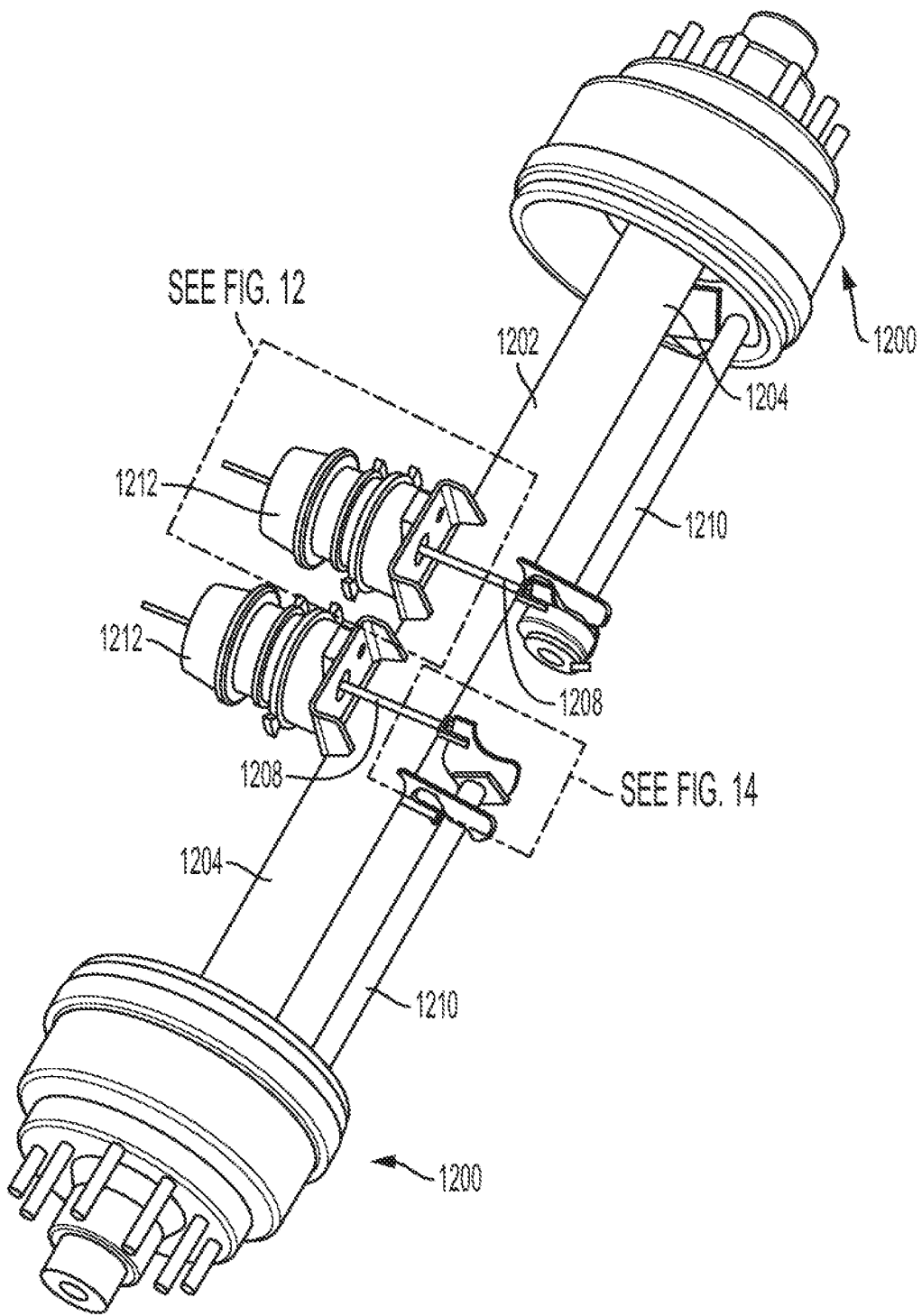
FIG. 11 is a perspective view of an axle with a drum brake system on each end in accordance with the subject technology.
Figure 13:
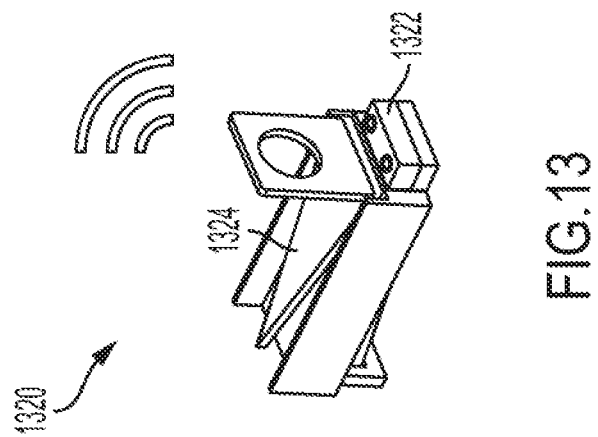
FIG. 13 is an isolated view of a brake sensor assembly in accordance with the subject technology.
Figure 12:
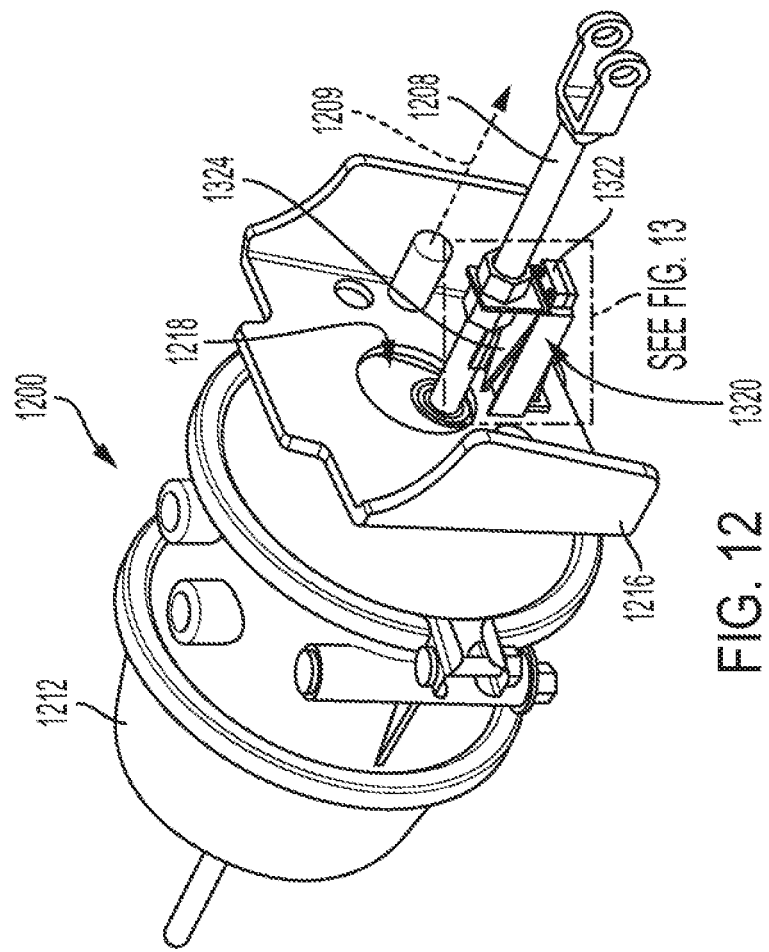
FIG. 12 is an isolated perspective view of a drum brake system in accordance with the subject technology.

Referring now to FIGS. 11-13, the vehicle (not shown) includes an axle 1202 having a brake system 1200 on each end 1204. When the brakes are applied, either by the driver or by command in an autonomous vehicle, an air brake chamber 1212 actuates a push arm or pushrod 1208 along motion arrow 1209. The movement of the pushrod 1208 rotates a cam shaft 1210 that controls movement of the brake pads.

Referring particularly to FIGS. 12 and 13, an exemplary sensor assembly 1320 is shown on the drum brake system 1200 and in isolation, respectively. The sensor assembly 1320 includes a sense element 1322 and a target portion 1324, which can be similar to the other sensors described herein. An air brake chamber 1212 of the brakes actuates the pushrod 1208 when the brakes are applied. A fixed brake chamber bracket 1216 is attached to the brake chamber 1212, the pushrod 1208 extending through an aperture 1218 in the brake chamber bracket 1216. The sense element 1322 is attached to the chamber bracket 1216 while the target portion 1324 is attached to the pushrod 1208. When the brakes are applied, the pushrod 1208 moves, changing the position of the target portion 1324 relative to the sense element 1322. These relative positions are measured and can be used to first calculate chamber stroke and ultimately calculate brake pad wear by means of algorithms that correlate the stroke of the brake chamber 1216 through the geometry of the slack adjuster, cam shaft/cam, and cam follower. The measured data from the sensor assembly 1320 can then be used as described with respect to other sensors herein.

Figure 15:
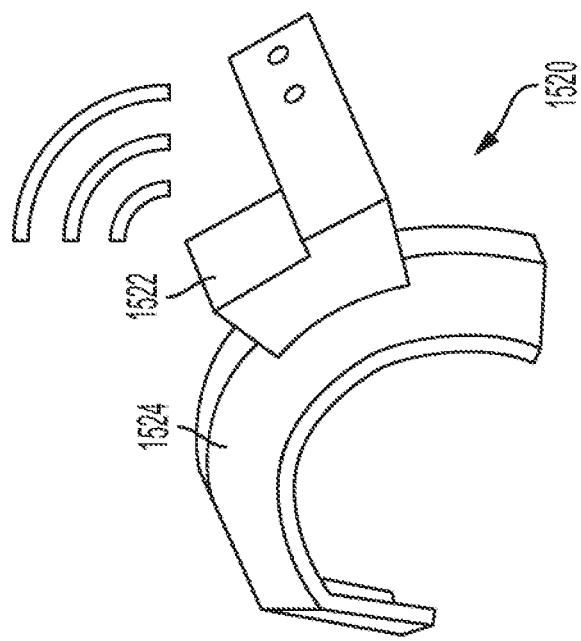
FIG. 15 is an isolated perspective view of a sensor assembly for the drum brake system of FIG. 14.
Figure 14:
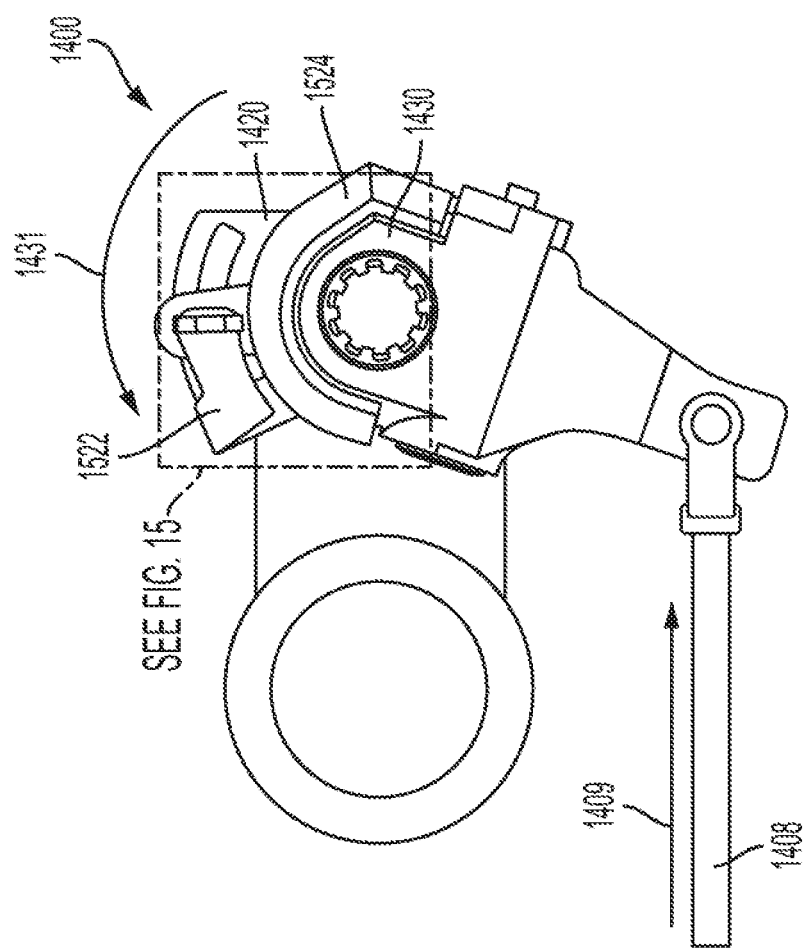
FIG. 14 is an end view of a drum brake system in accordance with the subject technology.

Referring now to FIGS. 14 and 15, an exemplary sensor assembly 1520 for a drum brake system 1400 is shown on the brake system 1400 and in isolation, respectively. The sensor assembly 1520 includes a sense element 1522 and an arcuate target element 1524, which can be similar to the other sensors described herein. The brake system 1400 includes a pushrod 1408 that moves parallel to motion arrow 1409. The pushrod 1408 is connected to a slack adjuster head assembly 1430 so that when the pushrod 1408 moves, the slack adjuster head assembly 1430 rotates as shown by motion arrow 1431. The target portion 1524 is mounted on the slack adjuster head assembly 1430 for rotational motion therewith. The brake system 1400 also includes a fixed mounting plate 1420 with the sense element 1522 coupled thereto.

When the brakes are applied, the pushrod motion 1409 causes the rotary motion 1431 of the slack adjuster head assembly 1430 and, in turn, similar motion of the target portion 1524. The sense element 1522 does not move. Thus, when the brakes are actuated, the position of the target portion 1524 relative to the sense element 1522 changes. These relative positions are measured and can be used to calculate brake pad wear by means of algorithms, as are described herein. The measured data from the sensor assembly 1520 can then be used as described with respect to other sensors herein.

Figure 17:
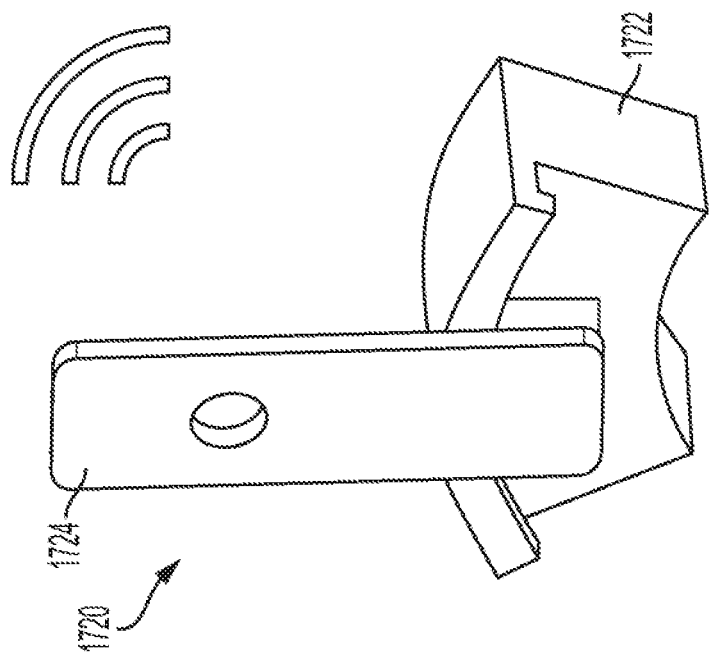
FIG. 17 is an isolated perspective view of a sensor assembly for the drum brake system of FIG. 16.
Figure 16:
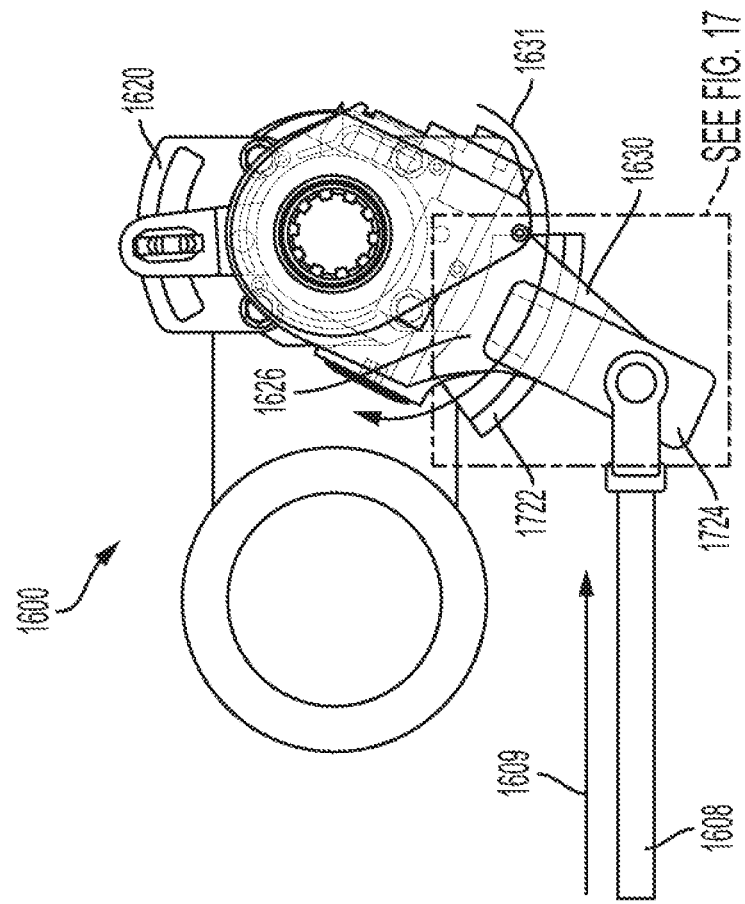
FIG. 16 is an end view of a drum brake system in accordance with the subject technology.

Referring now to FIGS. 16 and 17, another drum brake system 1600 and exemplary sensor assembly 1720 are shown. The sensor assembly 1720 includes a sense element 1722 and a target portion 1724, which can be similar to the other sensors described herein. The drum brake system 1600 is also similar to the brake system 1200 described above. The drum brake system 1600 includes an adapter plate 1626 coupled to an adjuster arm 1630. The adapter plate 1626 facilitates coupling the sense element 1722 in a fixed location. The target portion 1724 is attached to the adjacent moving adjuster arm 1630. Alternatively, the adapter plate 1626 could carry the target portion 1724 and the sense element 1722 could be attached to the adjuster arm 1630. In either case, the adapter plate 1626 exemplifies a possible retrofit application.

When the brakes are applied, the pushrod motion 1609 again causes a rotary motion 1631 of the slack adjuster arm 1630. In the example given, the target portion 1724 is attached to the moving adjuster arm 1630 and the sense element 1722 is fixed to the stationary adaptor plate 1626. Therefore, when the brakes are applied, the position of the target portion 1724 relative to the sense element 1722 changes. These relative positions are measured and can be used to calculate brake pad wear by means of algorithms as described herein. The measured data from the sensor can then be used as described with respect to other sensors herein.

Figure 19:
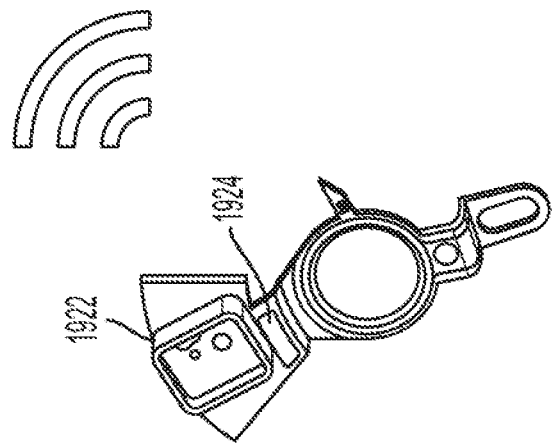
FIG. 19 is an isolated perspective view of a sensor assembly for the drum brake system of FIG. 18.
Figure 18:
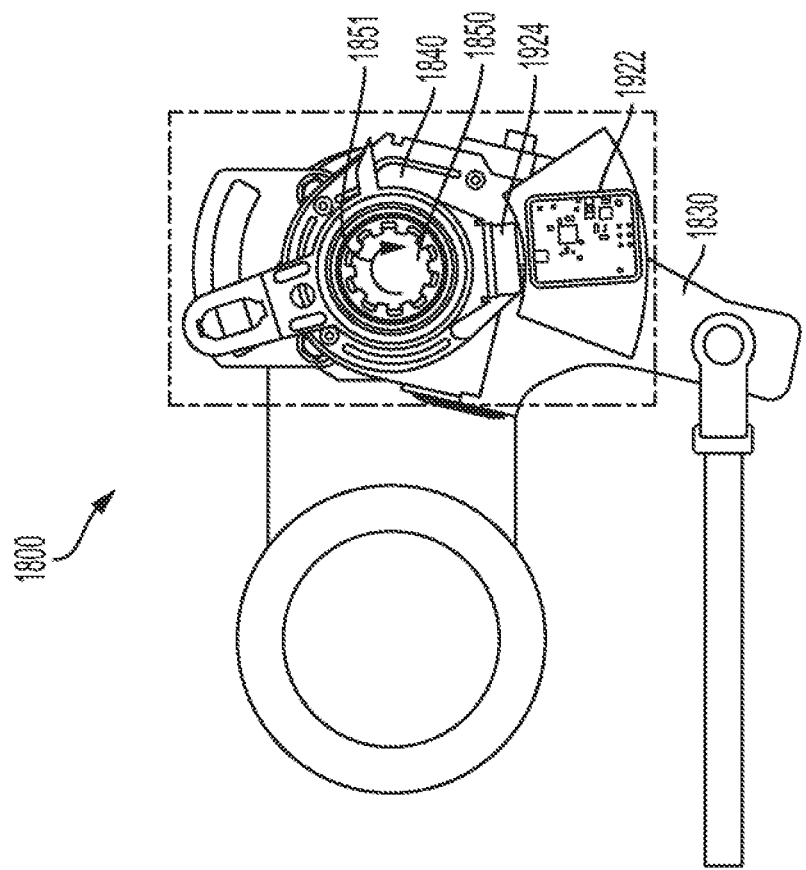
FIG. 18 is an end view of a drum brake system in accordance with the subject technology.

Referring now to FIGS. 18 and 19, yet another drum brake system 1800 with an exemplary sensor assembly 1920 are shown. The sensor assembly 1920 includes a sense element 1922 and a target portion 1924, which can be similar to the other sensors described herein. The drum brake system 1800 is also similar to drum brake system 1200. The drum brake system 1800 includes an indicator plate 1840 coupled to a cam shaft 1850.

When the brakes are actuated, the cam shaft 1850 rotates along arrow 1851 to cause the brake pads to contact the drum. The target portion 1924 is attached to the indicator plate 1840 which does not move in response to the brake pads being applied. However, the sense element 1922 is attached to the adjuster arm 1830 which moves when the cam shaft 1850 rotates. Therefore, when the brakes actuate, the position of the target portion 1924 relative to the sense element 1922 changes. These relative positions are measured and can be used to calculate brake pad wear by means of algorithms similar to those described herein. The measured data from the sensor can then be used as described with respect to other sensors herein.

Figure 20A:
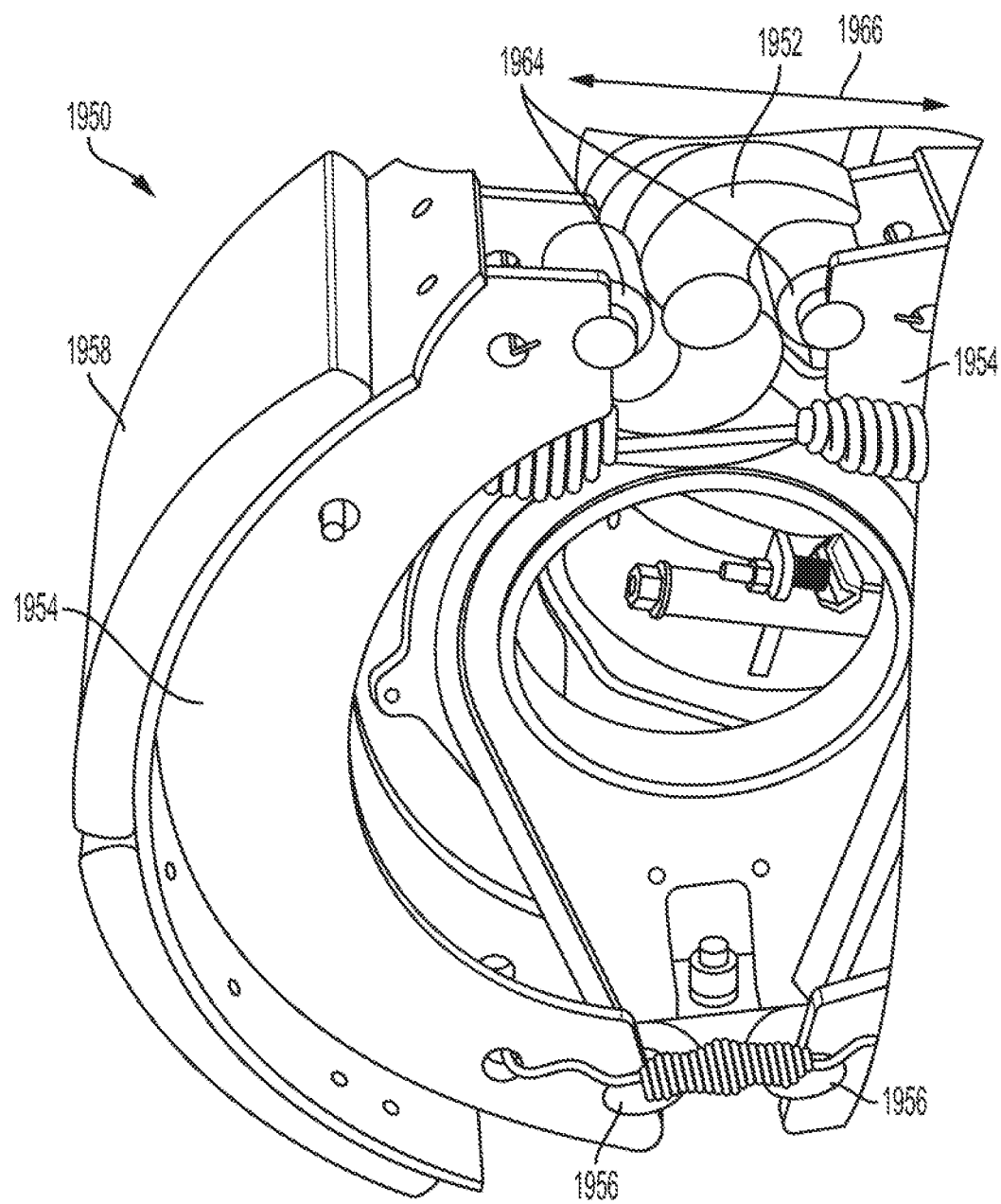
FIG. 20A is a perspective view of a drum brake system in accordance with the subject technology.

Referring now to FIG. 20A, the end of a drum brake system 1950 which is normally proximate a wheel is shown. The drum brake system 1950 can include the other components of drum brake systems as are described herein, and can be incorporated as part of any other drum brake system described herein. As described above, when the brakes are applied, actuation of the pushrod translates into rotation of a cam shaft (e.g. rotation of shaft 1210 in FIG. 11). This results in rotation of an s-cam 1952 on the end of the cam shaft. The drum brake system 1950 includes opposing brake shoes 1954 which are configured to pivot around anchor pins 1956. On the end distal from the anchor pins 1956, each brake shoe 1954 includes a cam follower 1964. Rotation of the s-cam 1952 engages the cam followers 1964, forcing the brake shoes 1954 outward along motion line 1966. When the brake system 1950 is fixed within a wheel during normal operation, the outward movement of the brake shoes 1954 causes the brake linings 1958 to engage the wheel and stop movement of the wheel.

Figure 20B:
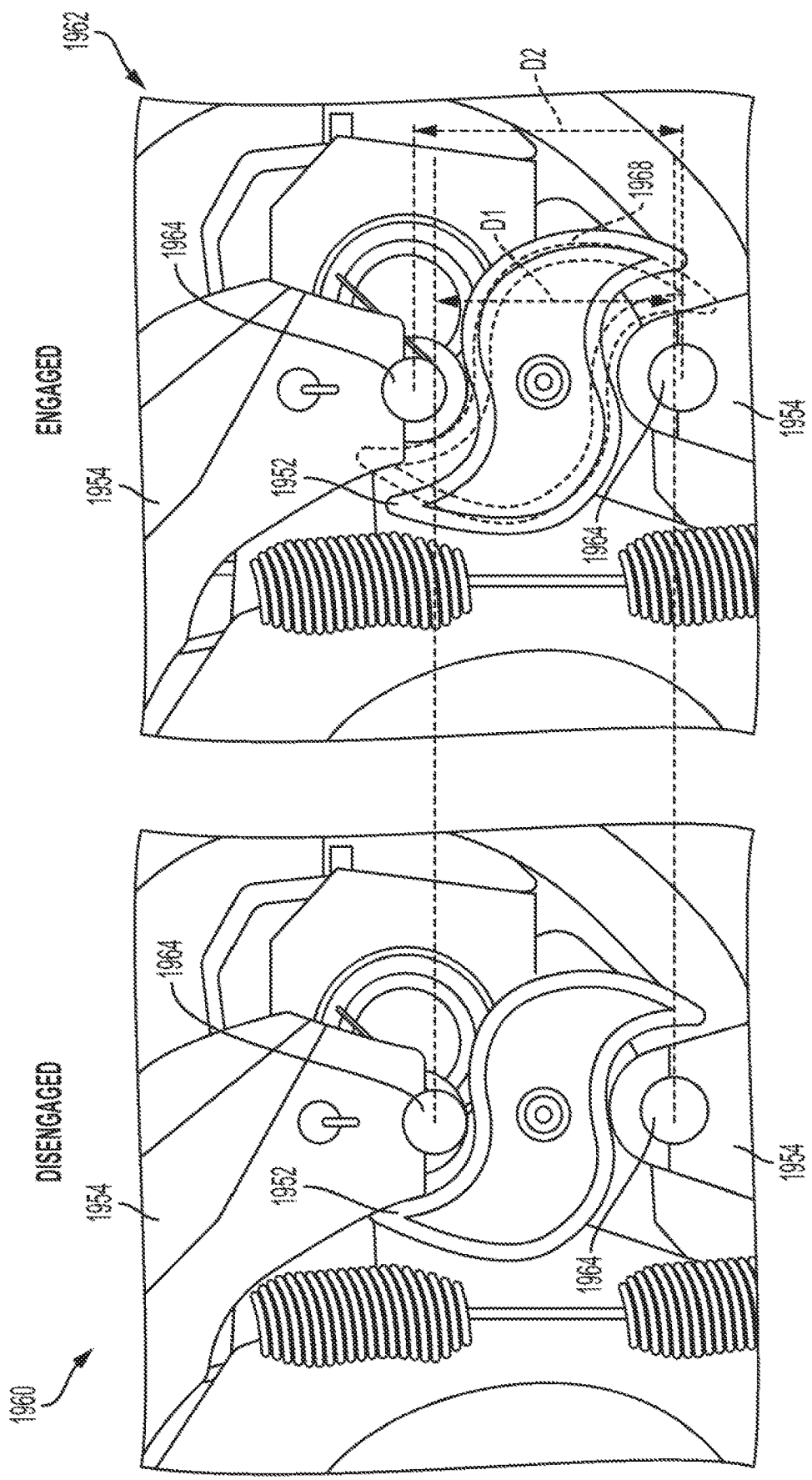
FIG. 20B illustrates two end views of a drum brake system with the brakes in disengaged and engaged states for comparison in accordance with the subject technology.

Referring now to FIG. 20B, a comparison is shown of the positioning of the s-cam 1950 with the brakes disengaged in image 1960 and with the brakes engaged in image 1962. As can be seen, the cam followers 1964 are separated by first distance D1 when the brakes are disengaged. When the brakes are engaged, cam followers 1964 slide along the rotating s-cam 1955 and reach a final separation distance D2 as the brakes are fully engaged. To show the rotational movement of the s-cam 1952, a phantom image of the s-cam 1968 in the original disengaged position with the brakes disengaged is shown in dashed lines superimposed over the final s-cam 1952 position in the example showing the brakes engaged 1962. In the engaged position in the example shown, the s-cam 1952 has rotated roughly 14 degrees between the disengaged and engaged positions of images 1960, 1962. As the brake pads wear, greater total rotation becomes required to fully engage the brakes.

Figure 20E:
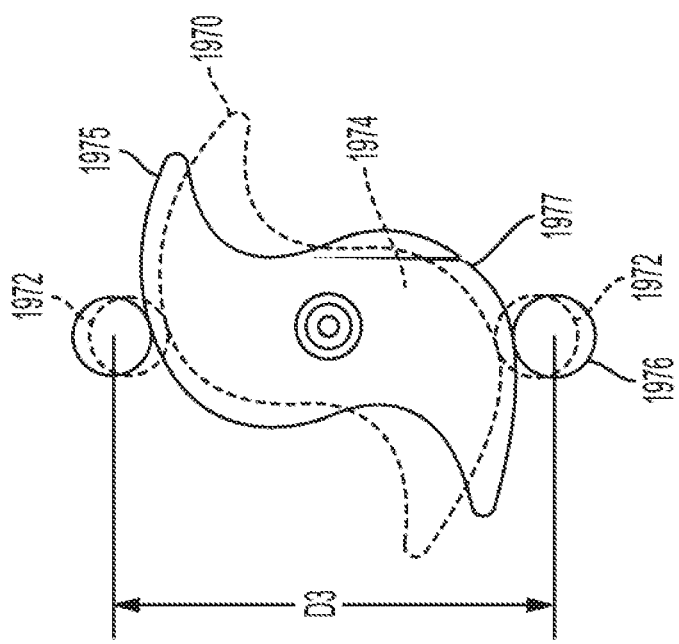
FIGS. 20C-E are schematic views of exemplary positioning of an s-cam and cam followers for the drum brake system of FIG. 20A in various positions of brake shoe life from new to end of life.
Figure 20D:
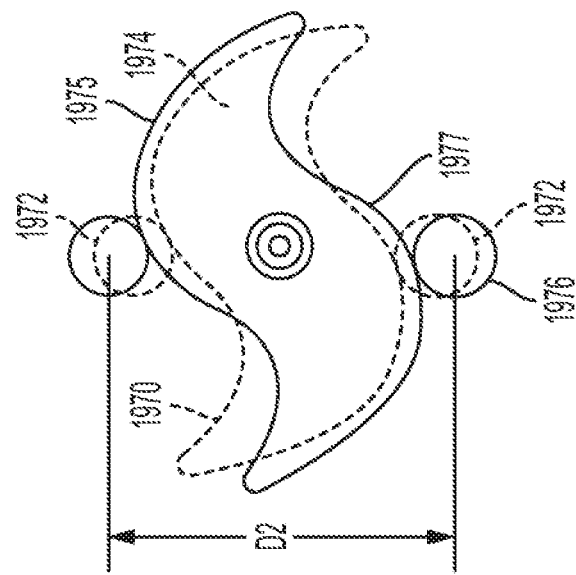
Figure 20C:
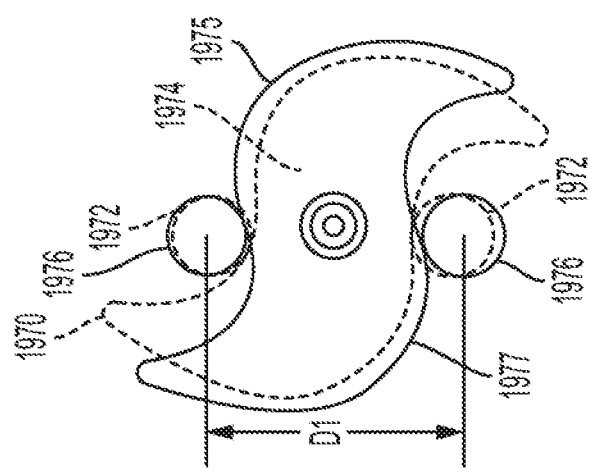

Referring now to FIGS. 20C-E, examples of typical positions of s-cams and cam followers are shown over life span of the brakes. In particular, FIG. 20C represents s-cam and cam follower positioning for a new brake, FIG. 20D represents s-cam and cam follower positioning for a brake near the middle of the brake life cycle, and FIG. 20E represents s-cam and cam follower positioning for a brake near the end of the brake life. In each FIG. 20C-E, the s-cam 1970 and cam followers 1972, in dashed lines, represent the positioning for a disengaged brake system, while the s-cam 1974 and cam followers 1976 represent the positioning for an engaged brake system. The slack adjuster of the braking system includes an adjuster mechanism that automatically compensates for brake pad wear by adjusting the positioning of the s-cam 1970 over the life of the brakes. In the example given, the slack adjuster seeks to keep the s-cam 1970 positioned such that approximately 14 degrees of rotation of the s-cam 1970 occurs between the disengaged s-cam 1970 and the engaged cam 1974. As the pads wear, the rotation required to fully engage the brakes increases. As can be seen, the s-cam 1970, 1974 position varies with wear so that the separation D1, D2, D3 between the cams 1972, 1976 increases with increased wear, with separation D3>D2>D1. Through this process, the opposing arcuate portions 1975, 1977 of the s-cam 1970, 1974 continue to interact with cam followers 1972, 1976 when the breaks are applied.

Figure 20F:
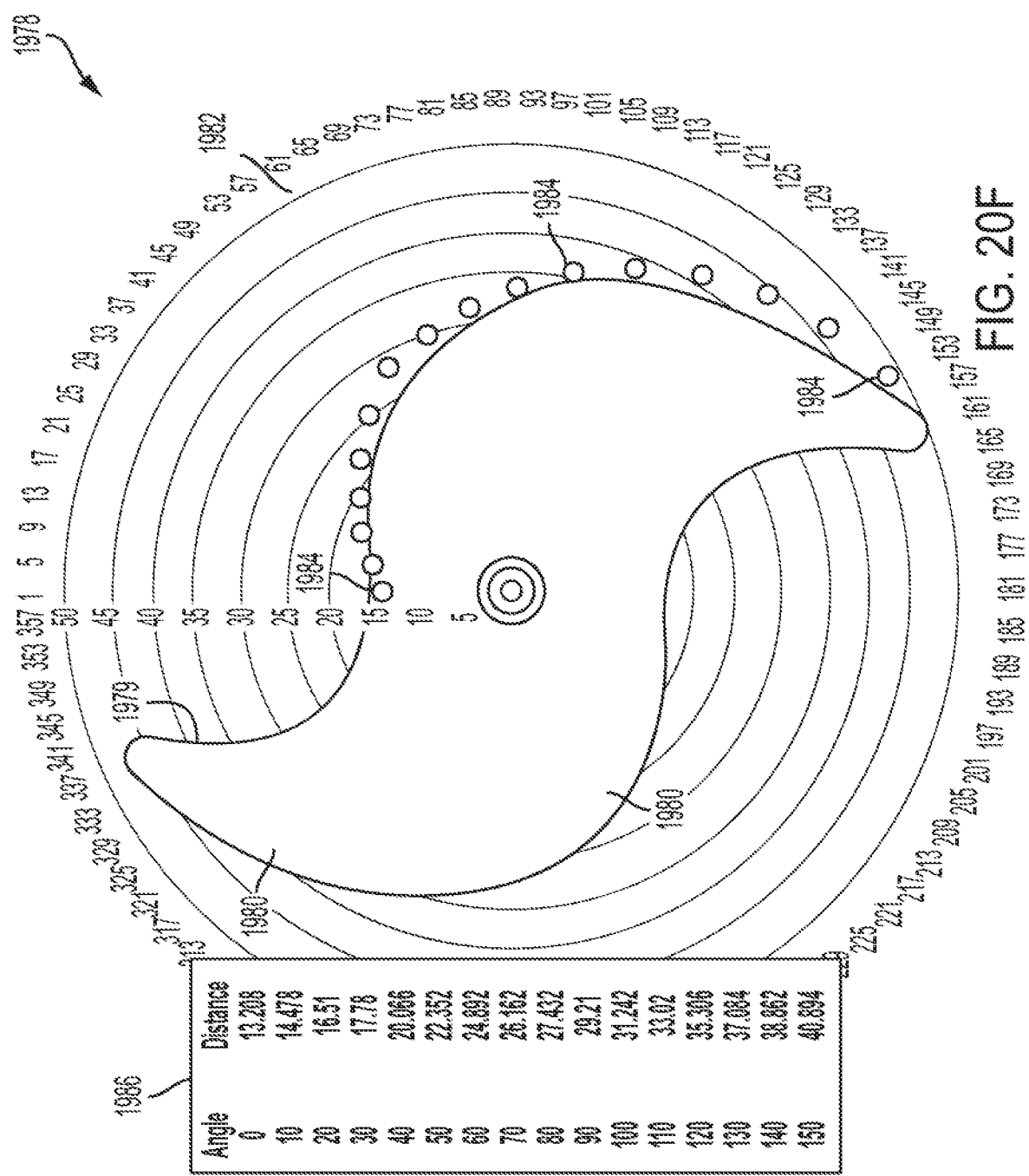
FIG. 20F is a graph mapping cam follower displacement at various s-cam rotations for the drum brake system of FIG. 20A.

Referring now to FIG. 20F, a graph 1978 of cam follower displacement at various s-cam rotations is shown. The concentric circles 1980 are zeroed at the center of the graph 1978 and represent a growing displacement between opposing cam followers in mm as the concentric circles 1980 approach the perimeter of the graph 1978. The circular perimeter 1982 represents a displacement distance of the s-cam 1979. The plot points 1984 represent the displacement of the cam followers at s-cam angle increments of 10 degrees. For ease of explanation, the values of the cam follower displacement at each s-cam angle plotted are then consolidated in a table 1986.

Figure 20G:
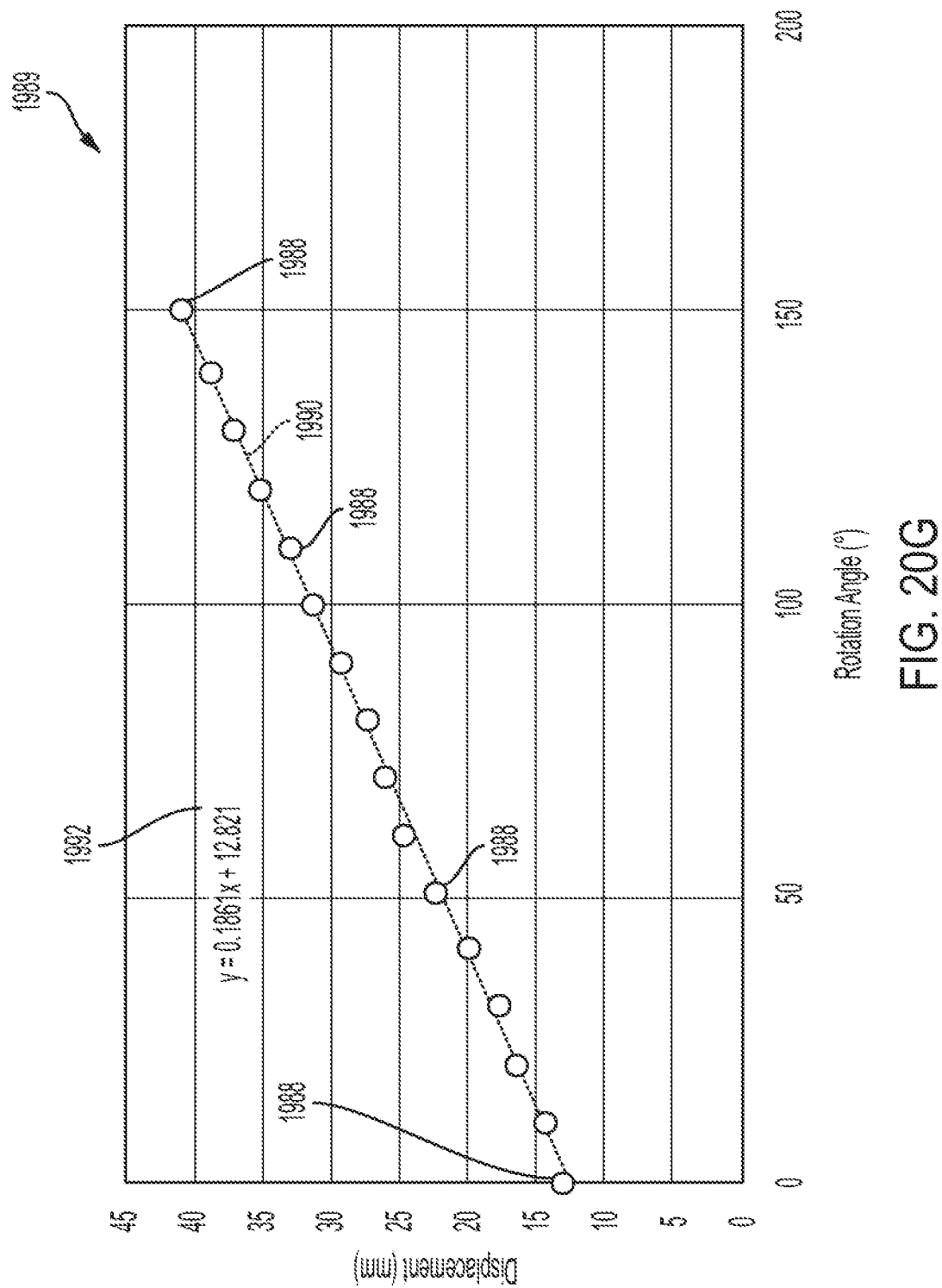
FIG. 20G is a graph plotting cam follower displacement at various s-cam rotations for the drum brake system of FIG. 20A.

Referring now to FIG. 20G, the table 1986 is plotted in a typical line graph format in graph 1989. The x-axis represents rotation angle of the s-cam in degrees, while the y-axis represents displacement distance between the cam followers in mm. The plot points 1988 are the values shown in the table 1986, which are also the plot points 1984 of the graph 1978. A trend line 1990 can then be formed between the plot points 1984. An equation 1992 of the trend line 1990 can be calculated. At any given point of the brake life, brake pad thickness can then be calculated using the difference between the current cam follower separation and the initial cam follower separation when the brakes were new. This is done in accordance with the following equation:

$$\text{Thickness} = t_i - m(\theta_n - \theta_i) \qquad \text{Eqn. 1}$$

In Equation 1, Thickness is the current calculated brake thickness to be determined, $t_i$ is the initial brake pad thickness, m is the slope of the trend line 1990, $\theta_n$ is the current s-cam angle, and $\theta_i$ is the initial s-cam angle. For example, if the initial s-cam angle for a brake system was 0 degrees, and the initial brake bad thickness was 22 mm, and assuming a graph slope of 0.1861 as calculated in FIG. 20G, Equation 1 for a current s-cam angle of 100 degrees would yield the following: Thickness=22 mm−0.1861 (100−0)=3.39 mm. Thus, when the s-cam rotation is at an angle of 100 degrees, the current brake pad thickness is determined to be 3.39 mm. This process can be repeated at different s-cam angles over the brake life to determine a brake pad replacement timing well in advance of brake failure. Notably, initial and current s-cam angles and cam follower displacement should be compared during like braking states (i.e. disengaged or engaged). In general, this process can be employed as an algorithm in connection with the braking systems described herein and used to calculate brake pad wear. As such, various sensors can be employed to gather data related to the s-cam rotational position, including any of the other position sensors described herein.

Based on the thickness calculations described above, a corresponding alert or message can be displayed for the user, indicating current brake pad thickness, wear, and/or likely miles until failure or recommended maintenance based additionally on the miles traveled to reach the current level of wear and likely level of brake pad failure. For example, assume the brake pad had worn from 20 mm to 10 mm in thickness over the first 100,000 miles traveled, and brake pad failure is assumed to occur at 5 mm. The brake system could include an algorithm to interpolate between the initial brake pad thickness of 20 mm to the expected failure thickness of 5 mm to determine that the brake pads were likely to reach 5 mm, and therefore fail, in another 50,000 miles. The remaining miles until expected brake pad failure could be displayed to the user constantly, or the system could be configured to automatically generate display a warning or alert a certain number of miles in advance of the expected failure point. The system could also factor in more advanced driving variables, such as the effects of city versus highway driving, the vehicle load, or other variables likely to cause non-uniform wear. The system could also aggregate and compare data from all brake sensors, comparing brake pad wear across all wheels to identify outliers which may be indicative of abnormalities and alerting the user of the wheels with potential faults. For example, a dragging brake will likely cause faster brake pad wear than the other brakes.

Information from the sensors as discussed above can be used in various contexts. Maintenance planning personnel can rely on the information for scheduling purposes. If the vehicle normally travels longer routes, brake pad replacement can be planned either before, or during a long trip based on the expected miles until brake pad failure. Information can also be provided to a fleet operator, as one of a larger group of indicators related to a trailer's road readiness. If the brake pads are likely to fail at some point during the expected truck route, the indicator can alert the fleet operator to this fact so that maintenance can be performed beforehand.

In should be understood all sensors described herein are configured for use in a VAN and as part of a system as described herein. In other embodiments, the sensor assemblies may utilize other contactless technology to determine the distance, such as optical devices, capacitive sensors, inductive sensors, sonar, radar and the like. Anisotropic magnetoresistance (AMR) and tunnel magnetoresistance (TMR) are also particularly well-suited for the subject technology because these methods consume little power in battery-based sensor assemblies.

As can be seen, the subject technology can be initially integrated into the brake structure or retrofit. In either case, the brake sensor is preferably not consumable. The brake sensor may have ample battery life to last for the life of the vehicle.

Figure 21:
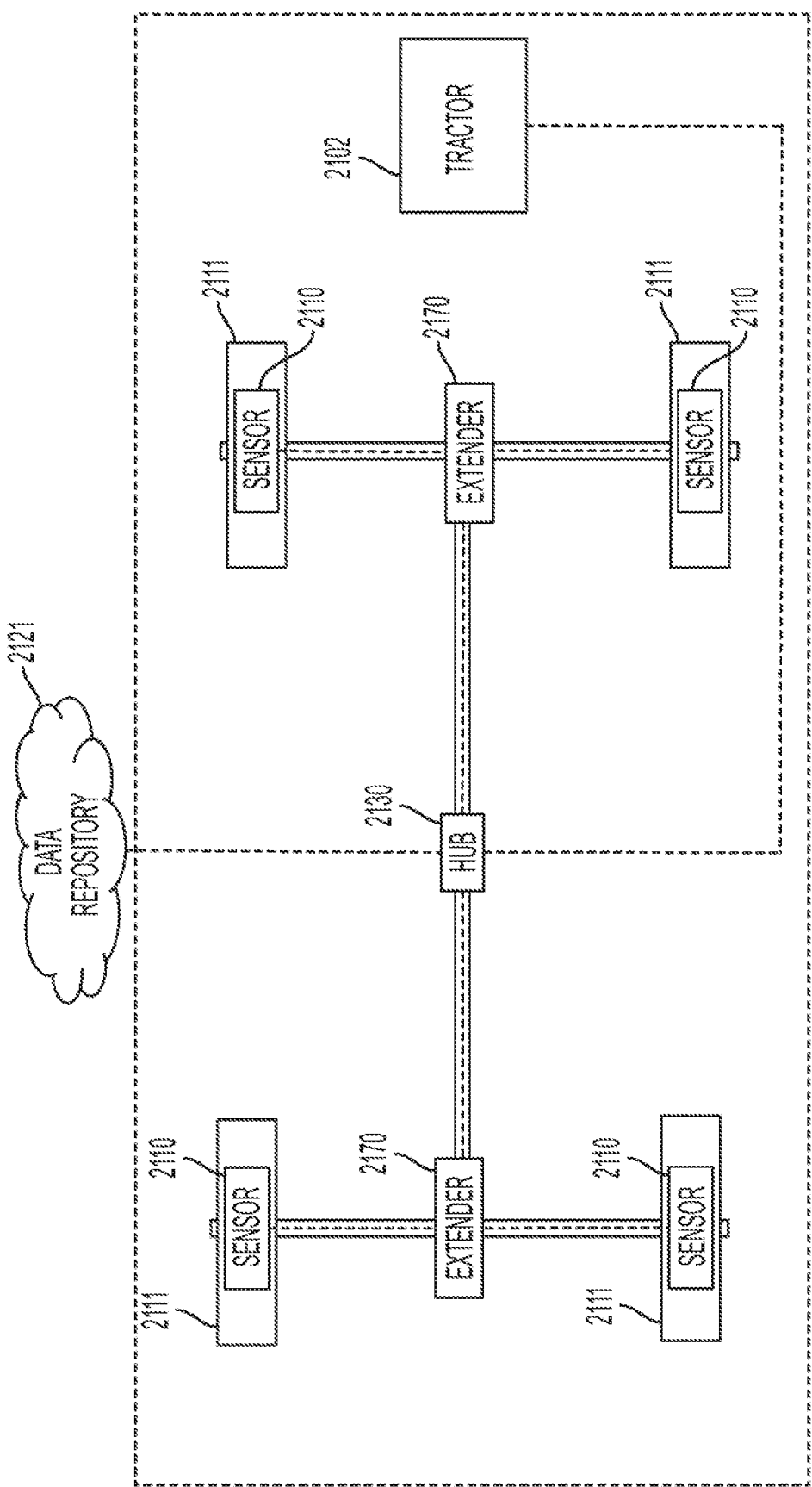
FIG. 21 is a schematic view of a vehicle having a vehicle area network with integrated brake sensor assemblies in accordance with the subject technology.

Referring now to FIG. 21, a schematic view of a vehicle area network (VAN) 2101 with integrated brake sensor assemblies 2110 is shown. The VAN 2101 is similar to that described above with respect to FIG. 1 and similar numbers in the "2000s" are used to designate similar components, not all of which are described again in detail. The brake sensor assemblies 2110 are each coupled to a wheel 2111. The VAN 2101 is in communication with a data repository 2121. The data repository 2121 may be integral with the tractor 2102 and/or at an external remote device (e.g., a server) as depicted, which the VAN can communicate with through a telematics device or the like.

As noted above, the sensors 2110 can remain in use after brake pad replacement. However, upon initial installation or at a change of brake pads, the sensors 2110 will typically require calibration. Calibration establishes the baseline for all subsequent measurements and by which the remaining pad thickness is determined. In one embodiment, the sensors 2110 are capable of measuring a total span of 25 mm. Of that span, about 18 mm to 20 mm is the friction pad thickness. With a new pad, the sensors 2110 are 'zeroed' so that relative movement indicating wear can be subtracted from the pad thickness to result in the remaining thickness by the repository 2121. Absolute position of the target element can be measured but relative position will be computed and recorded. Preferably, when new pads are installed or at the original commissioning, the sensors 2110 read close to zero absolute position to allow for the most useable measurement range over the life of the pad wear. If for example the data repository 2121 determines that the sensor absolute position is not within a predetermined tolerance with a new brake pad, the data repository can generate an out of tolerance 'zero' point indicating problems such as an incorrect sensor installation or that brake pads were installed with less than full-life thickness.

As the data repository 2121 receives information for the sensors 2110, the data repository 2121 improves the utilization, performance, and safety of the vehicle. For example, the data repository 2121 can determine a minimum brake pad thickness for comparison to a predetermined threshold. As brake pad wear is typically gradual, warnings can be provided to schedule replacement. The service team can pre-program levels for the warnings and alerts so breaching any legal or manufacturer suggested minimums is avoided. In one embodiment, the tractor dashboard may display a 'miles remaining' indicator before brake pad replacement is needed which is based on rate of brake pad wear captured over certain distances over time. The 'miles remaining' indicator may also be sent to one or more smart devices (e.g., desktop computers, smart phones and the like). The data repository 2121 aggregates all the brake sensors 2110 to compare the performance of each brake to the others. Thus, abnormal wear can be determined to uncover potential problems like a dragging brake or unbalanced force differential wearing more quickly than others.

The data repository 2121 can also include information about the type of routes typically covered by a particular vehicle or company. For example, a 20 mile per trip would not need the same warnings and alerts for 'miles to service' as a 1500 mile trip. For a longer trip, a mid-trip service may even be scheduled into the delivery timetable. Although the sensor readings are real-time or near real-time, the measurements may be provided periodically to preserve sensor battery life. With such constant monitoring, the data repository 2121 can beneficially use statistical modeling and use averages to minimize false nuisance alerts. The continuous stream of data allows for an actual status check prior to any trip, which goes beyond just a visual inspection.

Additionally, brake wear may be an advanced insight of driver behavior. Expected brake pad compression given the brake pad pressure load or degree to which the brakes were applied (e.g., the brake pads will be expected to compress to different degrees if the user lightly taps the brakes versus if they slam on the brakes for an emergency stop). Notably, this requires some input data regarding the degree to which the brakes were applied during one or more braking events. The second sensor reading can then be compared to an expected second sensor reading and if there is a significant deviation. Whether a particular deviation is significant can be determined on a case by case basis or based on compiled data for past known deviations from that particular vehicle or from a number of vehicles.

The sensors 2110 can also include temperature sensors. The temperature sensors may be internal to the brake pad wear sensor and/or a separate probe connected to or near the brake wear sensor. The temperature probe can be wired to the brake wear sensor so that the temperature data can be combined with the brake data for transmission. The data can then be transmitted to the range extenders 2170, and ultimately to the data repository 2121 and/or the tractor 2101 for display or generating a control command in an autonomous vehicle.

Temperature data is particularly insightful for brakes because brakes generate a significant amount of heat when operating properly and even more during heavy duty operation such as during steep downhill descents with a full load. Since brake pads lose some stopping power (coefficient of friction) as temperature rises, the driver can be warned to use the engine to slow the vehicle or the autonomous vehicle can make a similar adjustment. It is also possible for the brake pads to glaze and permanently degrade performance if temperatures are too high. Further, the heat generated by the brakes can result in damage to nearby components (e.g., ABS components) or in a more severe case, wheel end fires. By continuously monitoring temperature, warnings and proper action can be taken to avoid a reduction in braking potential that results in a longer required stopping distance. Still further, the data repository 2121 can generate alerts and/or change in drive control settings to avoid permanent damage to the brake pads and potentially the rotors due to excessive temperature. In the most extreme case, the data repository 2121 can warn of temperatures that could soon result in a wheel end fire due to ignition of the grease/oil or even the tire. In some cases, temperature sensors can also include ambient temperature sensors so that temperature sensor reading of the brake system can be normalized for ambient driving conditions.

Figure 22A:
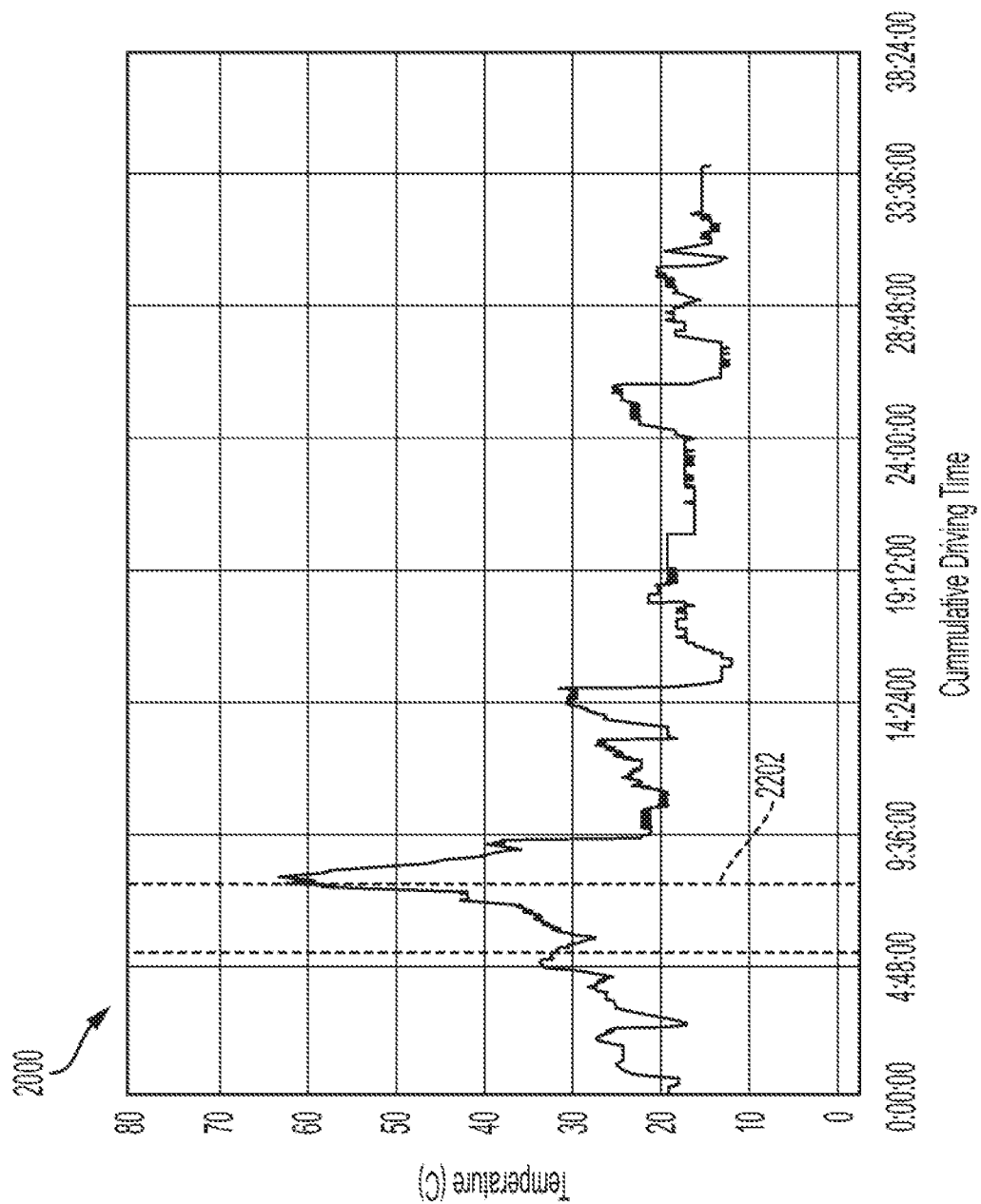
FIG. 22A is an exemplary graph of brake pad temperature over driving time for a braking system in accordance with the subject technology.

FIG. 22A is an exemplary graph 2200 of temperature in Celsius as measured by brake pad temperature sensors over cumulative driving time. When there is a significant spike in brake pad temperature, as indicated within block 2202 a processor, such as the wireless hub within the vehicle, can perform anomaly detection dependency modeling as shown in FIG. 22B.

Figure 22B:
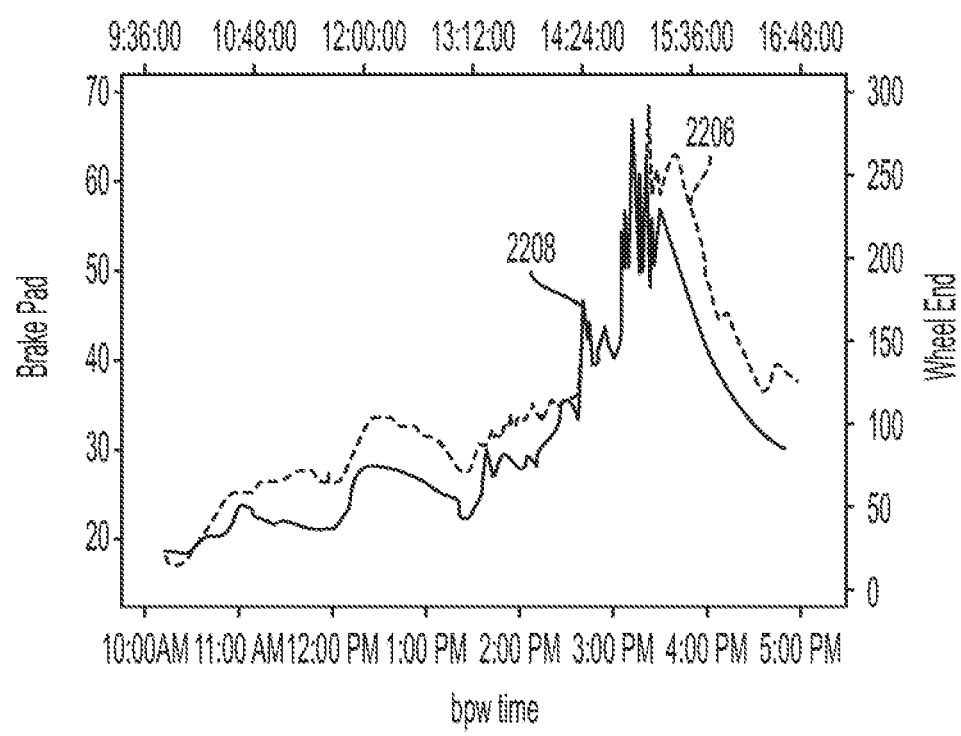
FIG. 22B is an exemplary graph comparing brake pad temperature and wheel end temperature over driving time for a braking system in accordance with the subject technology.

Referring now to FIG. 22B, the anomaly detection dependency modeling graph 2204 compares the temperature measured by the brake pad temperature sensors, represented by graph line 2206, to wheel end temperature tracked by wheel end temperature sensors at the respective wheel, represented by graph line 2208. If there is a significant discrepancy in the graph lines 2206, 2008 that can be indicative of an anomaly, and an alert can be provided to indicate a potential fault condition with the brake pads of the respective wheel. Additionally or alternatively, spikes in brake pad temperature can be compared across different wheels with significant differences also being indicative of fault conditions, as discussed above.

All orientations and arrangements of the components shown herein are used by way of example only. Further, it will be appreciated by those of ordinary skill in the pertinent art that the functions of several elements may, in alternative embodiments, be carried out by fewer elements or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation.

While the subject technology has been described with respect to preferred embodiments, those skilled in the art will readily appreciate that various changes and/or modifications can be made to the subject technology without departing from the spirit or scope of the subject technology. For example, each claim may depend from any or all claims in a multiple dependent manner even though such has not been originally claimed.

What is claimed is:

1. A system for measuring brake data from a drum brake assembly of a vehicle, the drum brake assembly including a brake chamber which actuates a push rod when vehicle brakes are applied, actuation of the push rod causing a rotary motion of an adjuster arm and attached slack adjuster head around a cam shaft, the system comprising:
a brake sensor mounted to the drum brake assembly and configured to measure brake data including a displacement of the drum brake assembly during braking, the brake sensor configured to transmit the brake data over a wireless vehicle area network,
wherein the drum brake assembly is configured to rotate an s-cam when the brakes are applied such that the s-cam engages two cam followers coupled to opposing brake shoes, and
wherein the displacement of the drum brake assembly is representative of a difference in displacement distance between the two cam followers when the drum brake assembly is in a disengaged state and when the brake assembly is in an engaged state.

2. The system of claim 1, wherein the brake sensor includes a sensing element and a target, the sensing element configured to sense a magnetic field of the target.

3. The system of claim 2, wherein:
the sensing element is attached to a fixed brake chamber bracket, the fixed brake chamber bracket remaining at a fixed location with respect to the vehicle when the vehicle brakes are applied; and
the target is attached to the push rod and configured to move, with respect to the sensing element, when the vehicle brakes are applied.

4. The system of claim 2, wherein:
the sensing element is attached to a fixed mount plate adjacent the slack adjuster head, the fixed mount plate remaining at a fixed location with respect to the vehicle when the vehicle brakes are applied; and
the target is attached to the slack adjuster head and configured to move, with respect to the sensing element, when the vehicle brakes are applied.

5. The system of claim 2, wherein:
the target is attached to a fixed indicator plate adjacent the cam shaft, the fixed indicator plate remaining at a fixed location with respect to the vehicle when the vehicle brakes are applied; and
the sensing element is attached to the adjuster arm such that the sensing element moves as the adjuster arm and cam shaft rotate when the vehicle brakes are applied.

6. The system of claim 2, wherein the target is a magnet that generates a magnetic field; and the sensing element is an anisotropic magnet resistivity sensor configured to sense the magnetic field of the magnet to generate a signal.

7. The system of claim 2, further comprising at least one temperature sensor;
wherein the system is configured to: detect an anomaly in a temperature measured by the at least one temperature sensor during a time period; after detecting an anomaly, compare the temperature measured by the at least one temperature sensor during the time period to temperature data from at least one wheel end temperature sensor; and generate and transmit an alert when the comparison is indicative of a fault condition.

8. The system of claim 1, wherein the system is configured to measure an s-cam rotation angle, the difference in displacement distance between the two cam followers being calculated based on the s-cam rotation angle.

9. The system of claim 8, wherein the system is configured to determine a current brake pad thickness by:
calibrating the drum brake assembly at an initial brake pad thickness ($t_i$) and initial s-cam rotation angle ($\theta_i$);
determining a slope of a plot of cam follower displacement over s-cam rotation angle (m);
measuring a current s-cam rotation angle ($\theta_n$); and
calculating the current brake pad thickness by setting the current brake pad thickness as equal to the following:
$t_i - m(\theta_n - \theta_i)$.

10. The system of claim 9, where the system is configured to provide an alert based on an expected brake pad failure thickness.

11. The system of claim 9, wherein the system is configured to provide an indicator of one or more of the following: a distance until drum brake assembly maintenance is recommended; or a distance until drum brake assembly failure is expected.

12. A sensing system for measuring brake data from a drum brake assembly having a pushrod configured to, in response to applying a braking force, cause a rotary motion of an s-cam around a cam shaft such that the s-cam engages two cam followers associated with opposing brake shoes, the sensing system comprising:
a sensing element; and
a target,
wherein the sensing element and the target are configured to move relative to each other in response to the rotary motion, and
wherein the sensing system is configured to determine, based on relative movement of the sensing element and the target, a difference in a displacement distance between the two cam followers when the brake assembly is in a disengaged state and when the brake assembly is in an engaged state.

13. The sensing system of claim 12, wherein the sensing system is configured to measure an s-cam rotation angle, the difference in displacement distance between the two cam followers being calculated based on the s-cam rotation angle.

14. The sensing system of claim 13, wherein the sensing system is configured to determine a current brake pad thickness based at least in part on a current s-cam rotation angle, an initial s-cam rotation angle, and an initial brake pad thickness.

15. The sensing system of claim 14, wherein the sensing system is configured to provide an alert based on an expected brake pad failure thickness.

16. The sensing system of claim 14, wherein the sensing system is configured to provide an indicator of at least one of a distance until drum brake assembly maintenance is recommended or a distance until drum brake assembly failure is expected.

17. The sensing system of claim 12, wherein:
the target is a magnet that generates a magnetic field; and
the sensing element is an anisotropic magnet resistivity sensor configured to sense the magnetic field of the magnet to generate a signal.

18. The sensing system of claim 12, wherein:
the sensing element is configured for attachment to a fixed brake chamber bracket, the fixed brake chamber bracket remaining at a fixed location when the braking force is applied; and
the target is configured for attachment to the pushrod.

19. The sensing system of claim 12, wherein:
the sensing element is attached to a fixed mount plate adjacent a slack adjuster head, the fixed mount plate remaining at a fixed location when the braking force is applied; and
the target is attached to the slack adjuster head and configured to move, with respect to the sensing element, when the braking force is applied.

20. The sensing system of claim 12, wherein:
the target is attached to a fixed indicator plate adjacent the cam shaft, the fixed indicator plate remaining at a fixed location when the braking force is applied; and
the sensing element is attached to an adjuster arm such that the sensing element moves as the adjuster arm and cam shaft rotate when the braking force is applied.

* * * * *